(12) United States Patent
Duncan

(10) Patent No.: US 7,658,242 B2
(45) Date of Patent: *Feb. 9, 2010

(54) HOLE CORING SYSTEM WITH LEVER ARM

(76) Inventor: C. Warren Duncan, 3317 W. Warner Ave., Santa Ana, CA (US) 92704

( * ) Notice: Subject to any disclaimer, the term of this patent is extended or adjusted under 35 U.S.C. 154(b) by 98 days.

This patent is subject to a terminal disclaimer.

(21) Appl. No.: 12/009,169

(22) Filed: Jan. 17, 2008

(65) Prior Publication Data

US 2008/0179105 A1 Jul. 31, 2008

Related U.S. Application Data

(63) Continuation-in-part of application No. 11/646,721, filed on Dec. 27, 2006, now Pat. No. 7,484,578.

(60) Provisional application No. 60/759,594, filed on Jan. 17, 2006.

(51) Int. Cl.
*E21B 10/02* (2006.01)
*E21B 3/00* (2006.01)

(52) U.S. Cl. ............... 175/57; 175/162; 175/195; 175/220; 175/402; 175/403; 175/408

(58) Field of Classification Search ........... 175/402, 175/403, 408, 57, 162, 195, 220; 408/204, 408/67
See application file for complete search history.

(56) References Cited

U.S. PATENT DOCUMENTS 5,393,175 A 2/1995 Courville
7,484,578 B2 * 2/2009 Duncan .................. 175/402

OTHER PUBLICATIONS

CS UNITEC, "Core Drill", 1 pg.
LENOX Company, "Hole Saw Kits", 2 pgs.

* cited by examiner

*Primary Examiner*—Hoang Dang
(74) *Attorney, Agent, or Firm*—Stetina Brunda Garred & Brucker

(57) ABSTRACT

A hole coring system for drilling large diameter holes with a handheld tool. The drill bit is guided by a mandrel attached to the concrete and serves as a central guidepost that ensures precise centering of the drill bit. Commonly available tools may be used to rotate the drill bit. A lever arm may be attached to the tool and used to resist any torquing action. Additionally, a brace may be attached to the lever arm which may be used to resist any torquing action.

18 Claims, 21 Drawing Sheets

HOLE CORING SYSTEM WITH LEVER ARM

CROSS-REFERENCE TO RELATED APPLICATIONS

The present application is a continuation in part application of U.S. patent application Ser. No. 11/646,761, filed Dec. 27, 2006 now U.S. Pat. No. 7,484,578 which claims the benefit of Provisional Patent Application Ser. No. 60/759,594 filed Jan. 17, 2006. The entire contents of both U.S. patent application Ser. No. 11/646,761 and Prov. Pat. App. Ser. No. 60/759,594 are expressly incorporated herein by reference.

STATEMENT RE: FEDERALLY SPONSORED RESEARCH/DEVELOPMENT

Not Applicable

BACKGROUND

1. Field of the Invention

The present invention relates to a tool designed to drill holes in concrete and other materials.

2. Description of the Prior Art

Holes have been drilled in concrete using masonry drill bits for many years. One problem that has persisted, especially when relatively large-diameter holes are drilled into concrete using a cylindrical, annular core drill bit, is that it is sometimes difficult to maintain the drill bit precisely centered so as to drill a completely circular and aligned large diameter hole into concrete, fiberglass, plastic, and other materials. The problem arises due to the tendency for one edge of the drill to make contact before another edge. Consequently, the drill tries to walk sideways erratically. There is a tendency for the drill bit to wobble or vibrate in a lateral direction, rather than stay precisely centered on the intended drill bit axis. As a result, it is difficult to drill holes in concrete, particularly large diameter holes, with portable equipment.

One prior system that has been developed to attempt to stabilize a drill bit is available under the trade designation "Core Drill Rig". This device operates somewhat in the manner of a drill press. However, unlike a drill press, there can be no stabilizing table beneath a workpiece when drilling into concrete. This is because the concrete structure into which a hole is drilled is always much too thick and expansive to lend itself to stabilization by a table located beneath the drill.

The Core Drill Rig employs a relatively large diameter, annular drill bit mounted on a drill held by a stanchion to one side of a frame. It is necessary to bolt the frame of the Core Drill Rig to the concrete surface to be drilled or hold it in place by suction in order to provide resistance to the drill bit so that the drill bit can penetrate the concrete. If the drill supporting frame is not bolted or otherwise secured to the concrete floor, the drill bit tends to lift off the concrete surface being drilled.

The supporting frame is provided with bolt holes and bolts that must be attached to the concrete structure into which the relatively large diameter hole is to be drilled. First, relatively small diameter holes must be drilled in the concrete at the bolt locations to allow the Core Drill Rig frame to be secured to a concrete floor or wall into which a large diameter hole is to be drilled. Once the frame is bolted to the surface it provides the drill bit with much greater stability than can be achieved using a hand-held drill. However, since the Core Drill Rig must be bolted to the surface, the holes that are used to attach the bolts that secure the frame to the concrete surface must later be filled. Also, considerable effort is required to bolt the frame to the surface to be drilled.

The Core Drill Rig can be configured with a vacuum device that creates a suction to draw the drill frame down to the concrete floor. However, it is difficult to achieve a sufficient suction force to prevent the frame from lifting off the floor and breaking the vacuum if one attempts to operate the drill with high torque. To the contrary, in conventional systems such as the Core Drill Rig, the large diameter drill bit can only be operated at a relatively low speed with a high torque in order for the hole drilled to be circular within acceptable tolerances.

Furthermore, conventional concrete core drills that employ stabilizing frames, such as the Core Drill Rig, are very bulky, heavy, and expensive. They cannot be conveniently packed in a small carry case. They also require a considerable volume of space for transportation in a truck or other work vehicle.

Another conventional annular drilling arrangement is the common hole saw. This is used primarily for cutting holes in wood. The hole saw incorporates a pilot drill fixed in the center of an annular strip of saw blade. The drill bit is simply attached to a chuck driven by a hand drill motor and the pilot drill makes a smaller hole to start off with. As the depth of drilling process progresses the larger annular drill bit engages. At this time the smaller hole acts as a guide for the larger drill.

Although this drilling system has been around for many years it is unsatisfactory for many materials, including concrete. The desirable features of the cutting action for the smaller pilot bit are not the same as those for the cutting action of the larger hole saw. For substances like concrete a percussion action is ideal for drills up to approximately one inch in diameter using carbide tips shaped to pulverize their way through the material with the percussion action. This action is not practical for the larger diameter, thin walled core bit that a hand held drill motor can practically hammer and rotate. Similarly a high rotational speed is more suited to the small pilot drill bit but these speeds may exceed the optimum speed for the large core bit, thus causing overheating and failure of the bit or melting of the material to be cut. In addition, the pilot drill is not aligned in an orientation that can be checked for accuracy before commencing the drilling of the larger hole. Also, the guiding tolerance does not remain constant since the pilot drill tends to "oval" the pilot hole with continued rotation thus causing irregular holes, variable location and misalignment.

BRIEF SUMMARY

A system has been devised that permits relatively large diameter holes to be drilled in a hard material like concrete, plastic, or fiberglass with a high degree of control in keeping the drill bit centered, but without the disadvantages of prior conventional systems. Specifically, one or more relatively small diameter anchor holes may be first bored into the concrete at or about the center at which a larger diameter hole is to be drilled using current conventional percussion tools or developed in the future. Once the anchor hole(s) has been drilled, a mandrel is secured to the concrete and aligned via a stabilizing plate. At this point, the mandrel extends upwardly and serves as a stabilizing guidepost for a relatively large diameter, hollow drill bit drive shaft.

The large diameter, hollow drill bit has a central, axial opening therein that receives a long, hollow, tubular sleeve of a drive shaft assembly. This sleeve fits over the mandrel and has a lower, hollow coupling which is internally lined with bearings near its lower extremity. A drill motor coupling is provided at the upper end of the tubular sleeve and is equipped with an appropriate fitting for connection to a handheld drill motor. The drill motor, through a suitable chuck arrangement, turns the hollow drive shaft assembly at a high speed in rotation about the anchored mandrel. The drill motor that is coupled to the drive shaft assembly and which turns the drive shaft assembly can be any one of a number of different power sources that are widely utilized in the industry.

The hollow, tubular core drill bit is coupled to the drive shaft assembly and is rotated about the anchored mandrel at a high speed by the hollow drive shaft assembly. The drive shaft assembly is maintained centered, turning in driving rotation in coaxial alignment relative to the mandrel. Internal bearing sleeves at the lower end of the drive shaft assembly reside in longitudinal sliding and rotational sliding contact with the anchored mandrel, thereby ensuring that the drive shaft assembly remains in precise, coaxial alignment with the anchored mandrel. Since the drive shaft assembly carries the tubular core drill bit at its lower end, the tubular core drill bit is likewise held in precise coaxial alignment with the anchored mandrel. As the tubular core drill bit advances into the concrete, the bearing sleeves at the lower end of the drive shaft assembly advance longitudinally along the outer surface of the anchored mandrel, as well as in high speed rotation relative thereto.

By utilizing the superior guidance provided by the mandrel and attached drill, high speed rotation can be achieved without vibration. This high speed enables the same or more power to be developed by the system with the lower pressure that can be applied by a manual operation.

By employing the stabilizing, anchored, mandrel and the hollow drive shaft assembly, the operator can precisely locate and drill a precision hole in a variety of materials using a hand operated portable tool.

In part because the drill is operated at high speeds, it is highly desirable, if not necessary, to supply cooling water both to cool the tubular core drill bit, as well as the bearings interposed between the drive shaft assembly and the anchored mandrel, and to flush out the concrete debris as it is drilled away. The coupling at the upper end of the drive shaft assembly is preferably equipped with some means to supply water to the cutting teeth of the hollow, tubular core drill bit. In some arrangements water is provided through a water swivel. Because the drive shaft assembly is rotated at a relatively high speed, the cooling water may be supplied down the center of the hollow drive shaft assembly either from a water feed drill motor or by means of a water swivel that conducts a flow of water radially inwardly toward the drive shaft assembly and down through its hollow center. The cooling water flows downwardly in the annular space between the inner surface of the tubular drive shaft assembly and the outer surface of the anchored mandrel and as a film between the bearing sleeves and the anchored mandrel guidepost. Below the bearing sleeves the water flows down into the circular, annular opening being drilled by the tubular core drill bit so as to cool the drill bit teeth and wash away the concrete debris as drilling progresses.

In one broad aspect, an apparatus for drilling holes in concrete may comprise: a central, cylindrical mandrel having an upper end, a lower anchoring and a smooth cylindrical intermediate, outer surface therebetween; a hollow, cylindrical annular drive shaft disposed axially about the mandrel and having an upper end with a drive motor coupling and an opposite driven end; at least one bearing mounted to the driven end of the annular, hollow drive shaft and residing in rotational and longitudinal sliding surface contact with the mandrel, whereby the drive shaft is freely rotatable about the mandrel and is also movable longitudinally relative to the mandrel; and a hollow, tubular core bit drill at the lower end of the drive shaft which has a lower annular, serrated edge with cutting teeth thereon.

A further preferred feature involves a system for releasably engaging the mandrel with the hollow drive shaft. This feature is particularly advantageous in drilling holes through concrete slab floors in the upper stories of a multistory building. In such a situation the mandrel, together with the cylindrical block or "doughnut" of concrete in which it is embedded will otherwise drop to the story below as the teeth of the annular drill bit break through the final structure of the concrete floor. The falling cylindrical block of concrete with the mandrel embedded therein at the very least will shatter into debris upon which workmen can slip. More importantly, the falling block of concrete could cause serious damage to objects in the space below. When it falls it can also cause serious bodily injury, or even death to a person below.

To prevent such a dangerous situation the mandrel may be provided with a releasable latching mechanism while the hollow, cylindrical, annular drive shaft is provided with an internal catch located below its driving end. As a result, the latching mechanism engages the internal catch once the driving end of the drive shaft is moved longitudinally relative to the anchoring support end of the mandrel and arrives at a predetermined engagement position relative thereto.

In an aspect of the hole coring system, the motor's housing may be fixedly attached (e.g., bolted, etc.) to the drill motor coupling (e.g., gearbox). In this manner, a torque reaction imposed on the motor's housing is resisted by the fixed attachment between the motor's housing and the drill motor coupling.

In an aspect of the hole coring system, a torque arm may be attached to the drill motor coupling (e.g., gearbox) to assist in resisting the torque reaction imposed on the drill motor coupling.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 10:
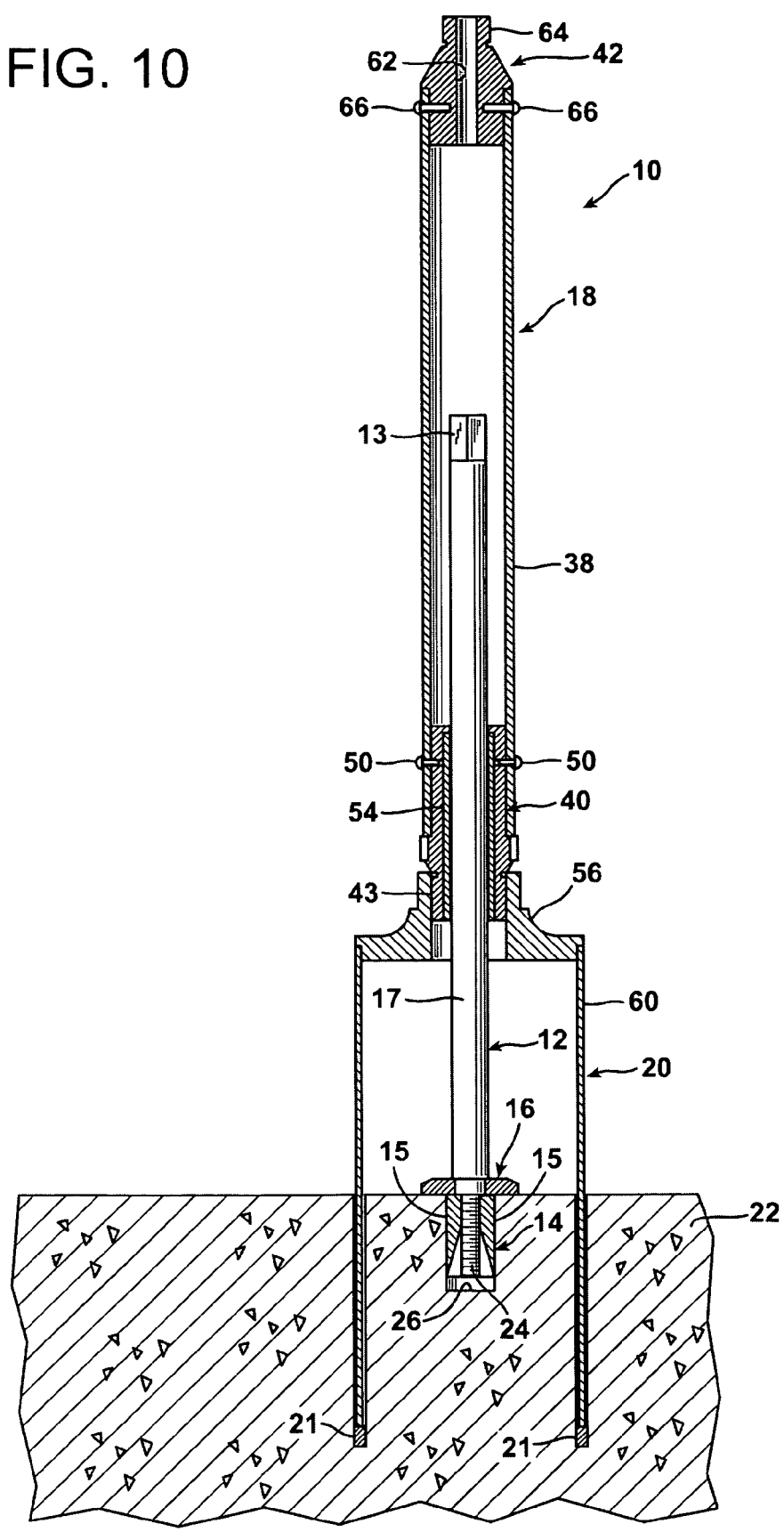
FIG. 10 is a sectional elevational view showing the hole coring system with components assembled and in operation.

FIG. 10 illustrates a hole coring system 10. The hole coring system 10 includes a mandrel 12, an anchor mechanism 14 attached to the lower end of the mandrel 12, a shoulder washer 16 for stabilizing the mandrel 12, a drive shaft assembly 18, and a hollow, tubular core drill bit 20. The mandrel 12 is a long, solid steel rod having an upper engagement end 13 of hexagonal cross section and an externally threaded lower anchoring support end 24. The mandrel 12 has a smooth, cylindrical, intermediate, outer surface 17 between its upper end 13 and its lower end 24. The diameter of the lower mandrel end 24 is smaller than the diameter of the cylindrical outer surface 17. The mandrel 12 is shown in isolation in FIG. 1.

Figure 4:
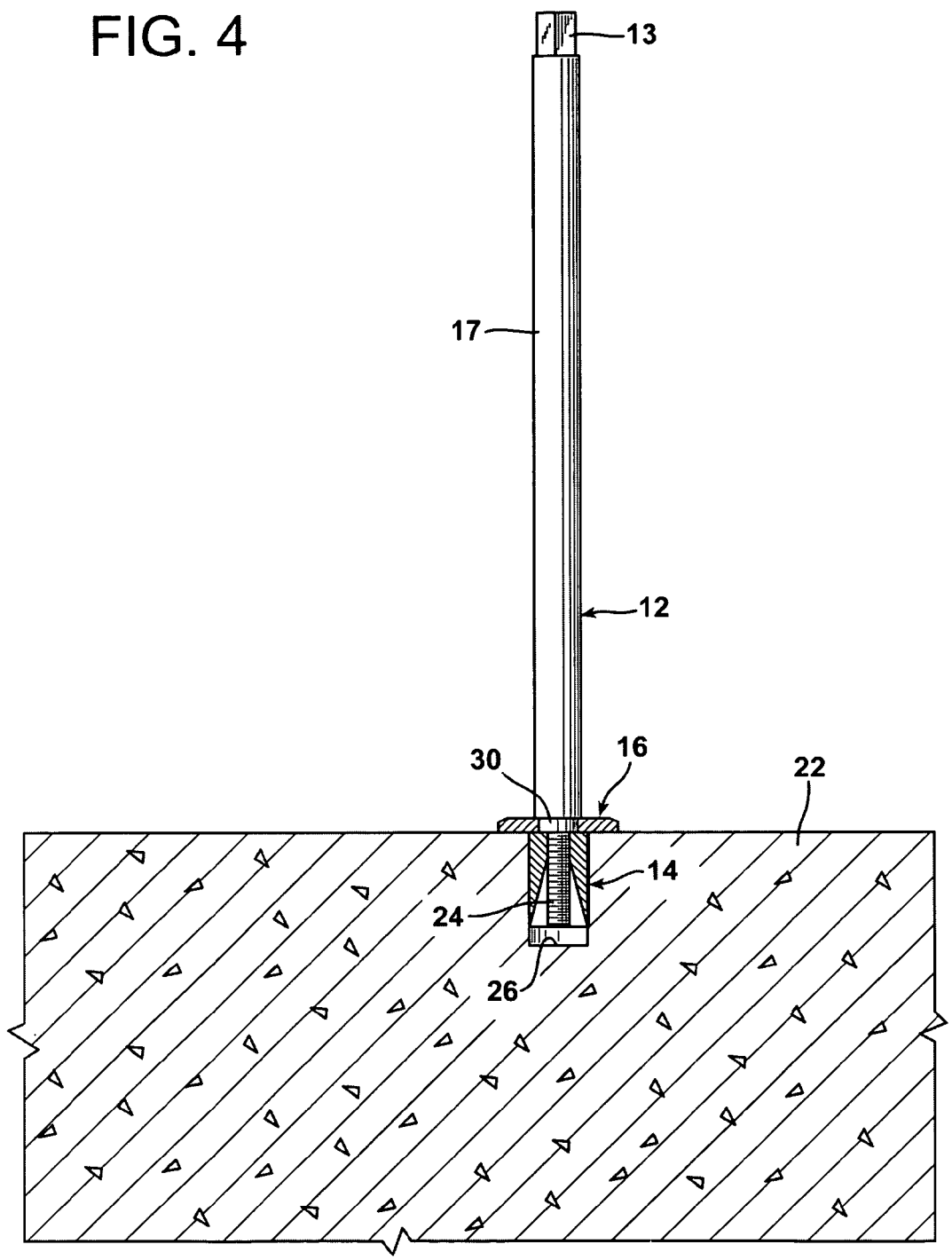
FIG. 4 is an elevational view showing the mandrel anchored in an anchor bore in a slab of concrete.

As shown in FIG. 4 the lower, anchoring support end 24 is provided with an expansion anchor mechanism 14. The anchor mechanism 14 is an expansion anchor that provides a rigid connection between the concrete material to be drilled, indicated at 22, and the mandrel 12. The anchor mechanism 14 in the illustration of FIG. 4 has radially expanding wings 15 and an internally threaded neck that is threadably engaged on the externally threaded lower anchoring support end 24 of the mandrel 12. As the threaded end 24 is advanced into the anchor mechanism 14, the lower ends of the wings 15 of the expansion anchor mechanism 14 are forced radially outwardly, thereby firmly lodging the anchor mechanism 14 in a relatively small diameter anchor bore 26 previously drilled into the concrete 22 using a conventional, small diameter masonry drill. In alternative embodiments, the anchor mechanism 14 may be, for example and not limitation, a toggle bolt, a glue-on system, or a glue-in system.

Figure 1:
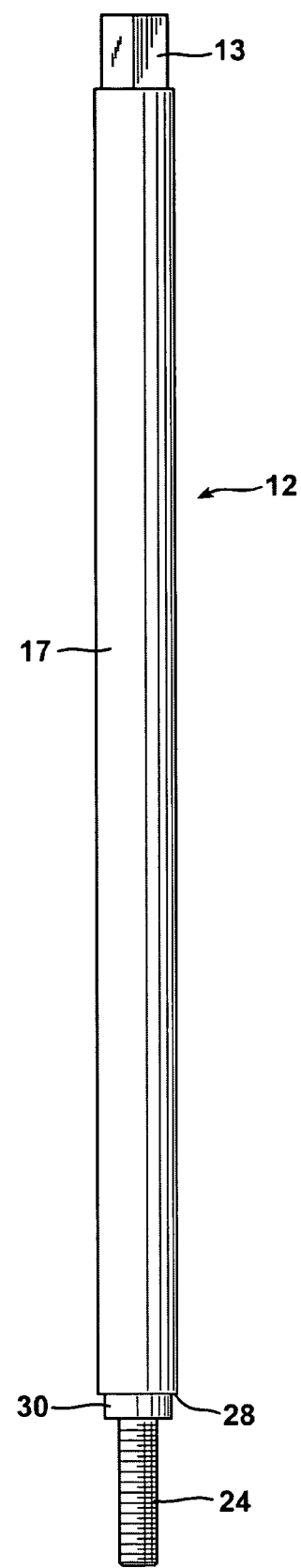
FIG. 1 is a side elevational view illustrating the mandrel of the hole coring system in isolation.
Figure 2:
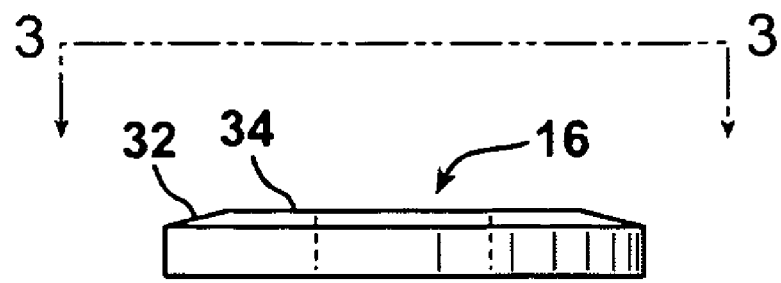
FIG. 2 is a side elevational view of the mandrel stabilizing washer shown in isolation.
Figure 3:
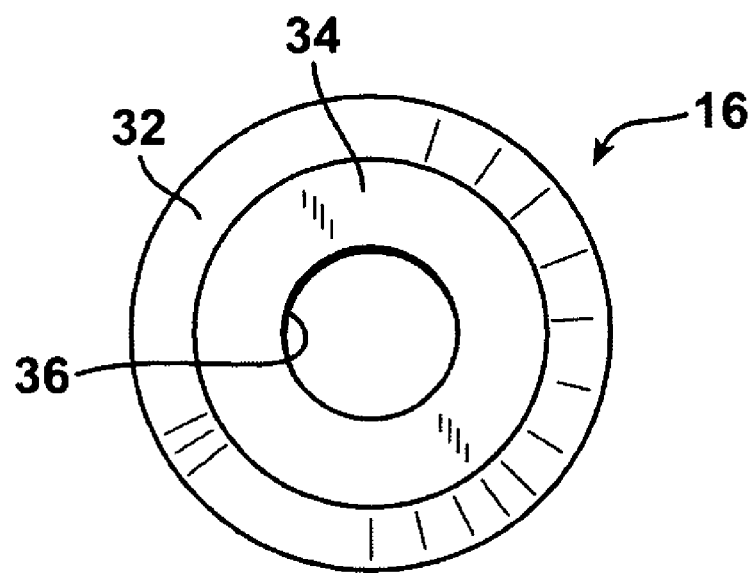
FIG. 3 is a top plan view of the mandrel washer shown in FIG. 2.

Before inserting the lower end 24 of the mandrel 12 into the anchor mechanism 14, the mandrel washer 16 is interposed between the anchor mechanism 14 and the larger, downwardly facing shoulder 28 at the lower end 24 of the mandrel 12. The shoulder 28 is illustrated in FIG. 1. Beneath the shoulder 28 the mandrel 12 is provided with a neck 30 just slightly larger in diameter than the externally threaded tip of the lower mandrel end 24, but smaller in diameter than the smooth, cylindrical, intermediate, outer surface 17. The neck 30 is of an axial length just long enough to receive the shoulder washer 16, shown in isolation in FIGS. 2 and 3.

The shoulder washer 16 is an annular disc-shaped structure which may have a thickness of 0.20 inches and an outer diameter of 1.750 inches and serves as an annular, stabilizing plate. The shoulder washer 16 has a frustoconical surface 32 that tapers slightly from the outer diameter of the shoulder washer 16 up to a flat, annular bearing face 34, which has an outer diameter of 1.250 inches. The diameter of the central aperture 36 of the shoulder washer 16 may, for example, be 0.625 inches.

To install the mandrel 12 in the concrete slab 22, the small diameter, cylindrical anchor bore 26 is first drilled with a masonry drill. The diameter of the bore 26 is of a size corresponding to the outer diameter of the expansion anchor mechanism 14 in its unexpanded state. The anchor mechanism 14 is then inserted into the bore 26 with a force fit against the walls thereof. It may be necessary to pound the anchor mechanism 14 into the position illustrated in FIG. 4. Thereafter, the shoulder washer 16 is inserted onto the lower end of the mandrel 12 oriented perpendicular thereto and disposed about the neck 30. The threaded tip of the lower end 24 of the mandrel 12 is then advanced into the expansion anchor mechanism 14, thereby forcing its expansion wings 15 radially outwardly against the cylindrical wall of the cylindrical anchor bore 26 so that the anchor mechanism 14 is tightly lodged in the bore 26. The mandrel 12 may be advanced downwardly using a wrench to engage the hexagonal upper end 13.

The mandrel and washer are attached to the concrete. The mandrel 12 is tightened against the washer 16, which has a considerably wider base. Eventually, the washer may be pulled against the concrete surface by the anchor mechanism. The mandrel 12 is tightened with sufficient tension so as to form a connection which provides a considerable degree of resistance to bending moment from the proper orientation of the mandrel 12 relative to the concrete slab 22. In this way a stiff and accurate guide is provided for the core drill at some distance from the surface to be drilled.

It is contemplated that the washer 16 be glued to the surface to be drilled, preferably by a fast setting glue. It is also contemplated that the washer 16 may have an adjustable angle for applications requiring a hole to be drilled at an angle to the surface to be drilled.

The lower, externally threaded end 24 of the mandrel 12 is fully advanced into the anchor mechanism 14 until the shoulder 28 bears tightly downwardly to squeeze the mandrel washer 16 against the exposed, flat, horizontal upper surface of the concrete slab 22. The lower extremity of the mandrel 12 is thereby lodged in the anchor mechanism 14, which, in turn, is wedged tightly into the bore 26. The portion of the mandrel 12 above its lower end 24 thereby forms a very firm, upright stabilizing and centering post for the drive shaft assembly 18.

Figure 7:
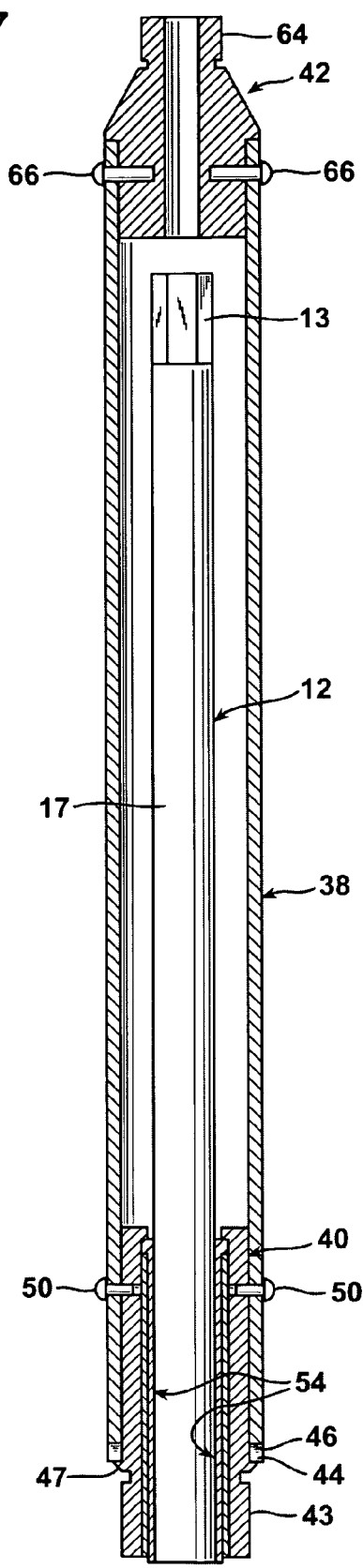
FIG. 7 is a sectional elevational view showing the drive shaft assembly in which the couplings of FIGS. 5 and 6 are engaged on the drive shaft, disposed upon the upper end of the mandrel of FIG. 1.

The mandrel 12 is oriented perpendicular to the upper surface of the concrete slab 22, as illustrated in FIGS. 4 and 7.

Figure 5:
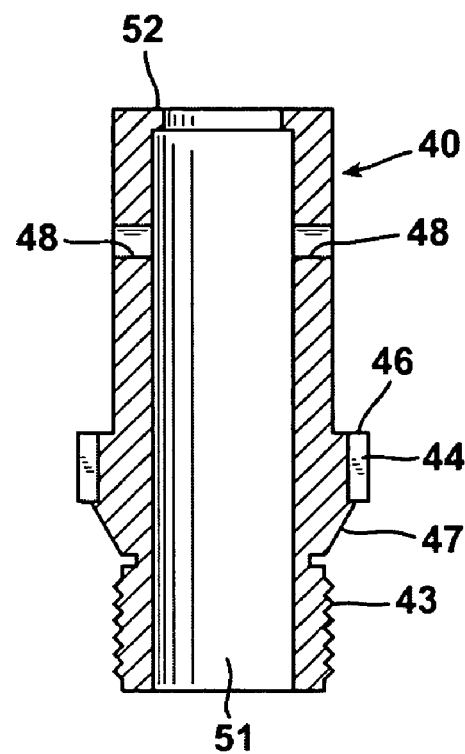
FIG. 5 is a sectional elevational detail showing the lower coupling for the lower end of the drive shaft in isolation.
Figure 9:
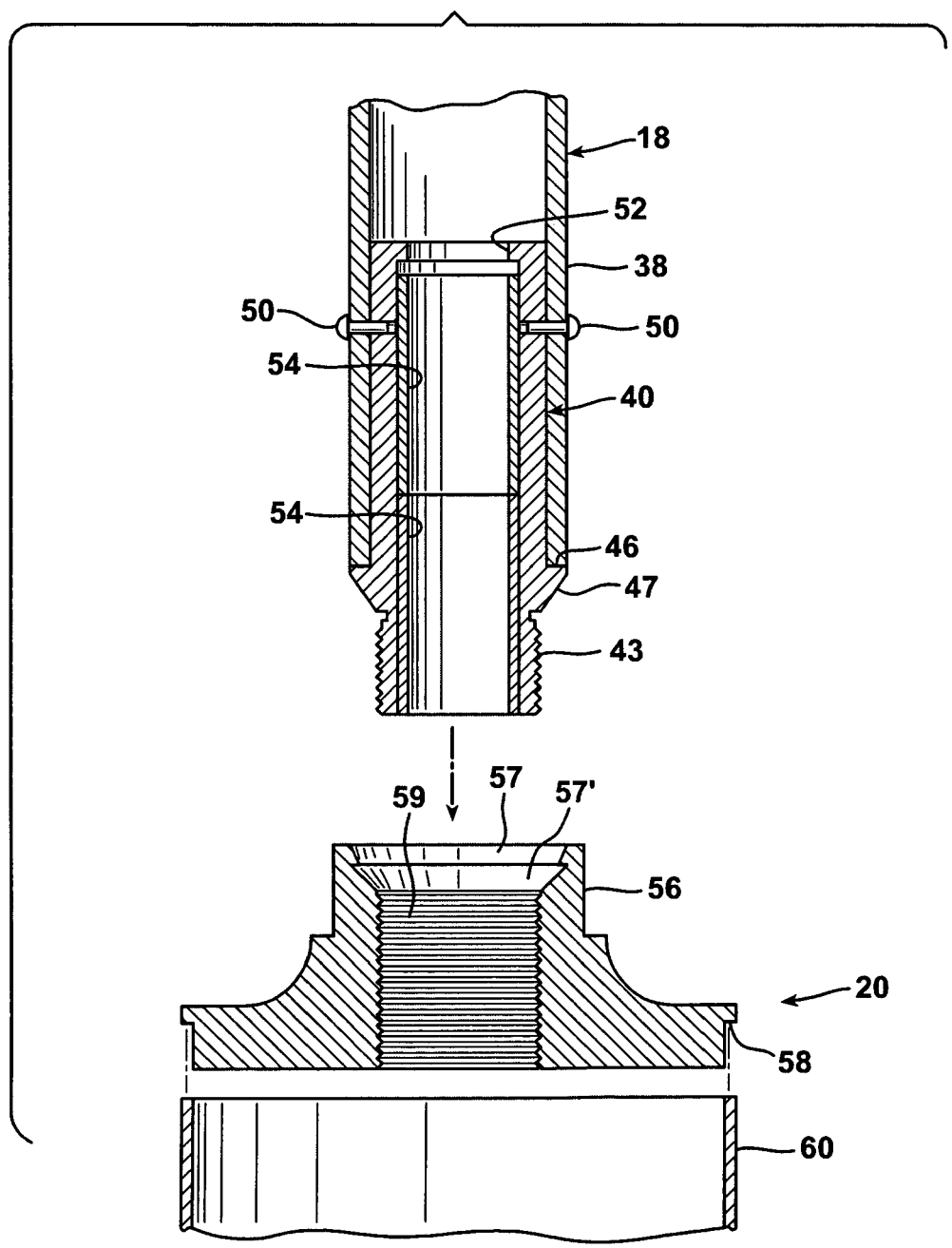
FIG. 9 is an exploded sectional detail illustrating the threaded connection and bearing sleeves at the lower end of the drive shaft assembly in preparation for engagement with the tubular core drill bit collar.

The drive shaft assembly 18 is formed of a hollow, tubular, cylindrical annular drive shaft 38 having an externally threaded, hollow lower drill bit coupling 40 inserted into its lower extremity and an externally threaded drive motor coupling 42 inserted into its upper extremity. The lower coupling 40 is illustrated in section and in isolation in FIG. 5. The lower coupling 40 is provided with a barrel-shaped body with an externally threaded nipple 43 at its lower end. The nipple 43 may be provided with a 11/4-12 Class 3B thread. Above the nipple 43 the lower coupling 14 is provided with a radially outwardly tapered region 47 that terminates in a drive shaft seat 44 that defines an upwardly facing annular shoulder 46. The shoulder 46 is of a diameter slightly greater than the outer diameter of the tubular drive shaft 38 so as to seat the lower edge of the drive shaft 38 which resides in abutment thereon, as shown in FIGS. 7 and 9. The lower coupling 40 is provided with a pair of diametrically opposed, internally threaded, radially directed fastener bores 48, as illustrated in FIG. 5. The fastener bores 48 receive the externally threaded shanks of a pair of diametrically opposed shear pins 50, as illustrated in FIG. 10. It is contemplated that the hollow drive shaft 38 may have a circular configuration or polygonal configuration (e.g., hexagonal, etc.).

The interior of the lower coupling 40 has a smooth cylindrical wall 51 throughout most of its length but terminates at a reduced diameter collar 52 at its upper extremity. The smooth wall bore 51 through the lower coupling 40 accommodates at least one, and preferably a pair of cylindrical, annular Oil Lite bearing 54. These are annular bronze sleeve-shaped bearings 54 formed of porous powdered metal and vacuum impregnated with oil that lasts the useful life of the bearings 54. The pair of bearings 54 are visible in FIGS. 7 and 10 and are illustrated in greater detail in the exploded view of FIG. 9. The internal diameter of the bearings 54 just fits over the outer diameter of the cylindrical intermediate outer surface 17 of the upwardly projecting shaft portion of the mandrel 12.

The nipple 43 of the lower coupling 40 is threadably engageable in the internally tapped collar 56 attached to the tubular core drill bit 20, as indicated in FIG. 9. The collar 56 is internally chamfered and has a elevated, frustoconical band 57 at its upper extremity. The band 57 is elevated a distance of 0.010 inches above the chamfered region 57' located beneath and radially inwardly from the band 57. That is, the outer annular band 57 is raised a small distance up from the inner chamfered surface 57'. The reason for providing the frustoconical band 57 on the internal engagement surface of the collar 56 is to provide a stabilizing bearing surface that resists torsional forces acting in a vertical plane that passes through the axis of alignment of the drive shaft assembly 18.

The collar 56 is internally threaded at 59, as shown in FIG. 9. Due to the necessary tolerances that are required between the threaded nipple 43 and the internal threads 59 in the collar 56, bending forces exist that would otherwise tend to bend the drive shaft assembly 18 out of precise coaxial alignment with the collar 56. However, by providing the elevated frustoconical band 57 radially outboard as far as possible from the axis of alignment of the drive shaft assembly 18 and the collar 56, the complete, tightened engagement of the threads of the nipple 43 with the internal threads 59 provides centering and alignment forces at the interface between the two matched, inclined surfaces 57 and 47. The result is that the drive shaft assembly 18 is clamped tightly to the core drill bit 20 so that the drive shaft assembly 18 and the core drill bit 20 are held in tight, nearly perfect alignment. These forces correct the "play" that would otherwise occur between the male threads of the nipple 43 and the female threads 59 of these two key components, namely the lower coupling 40 and the collar 56.

Figure 8:
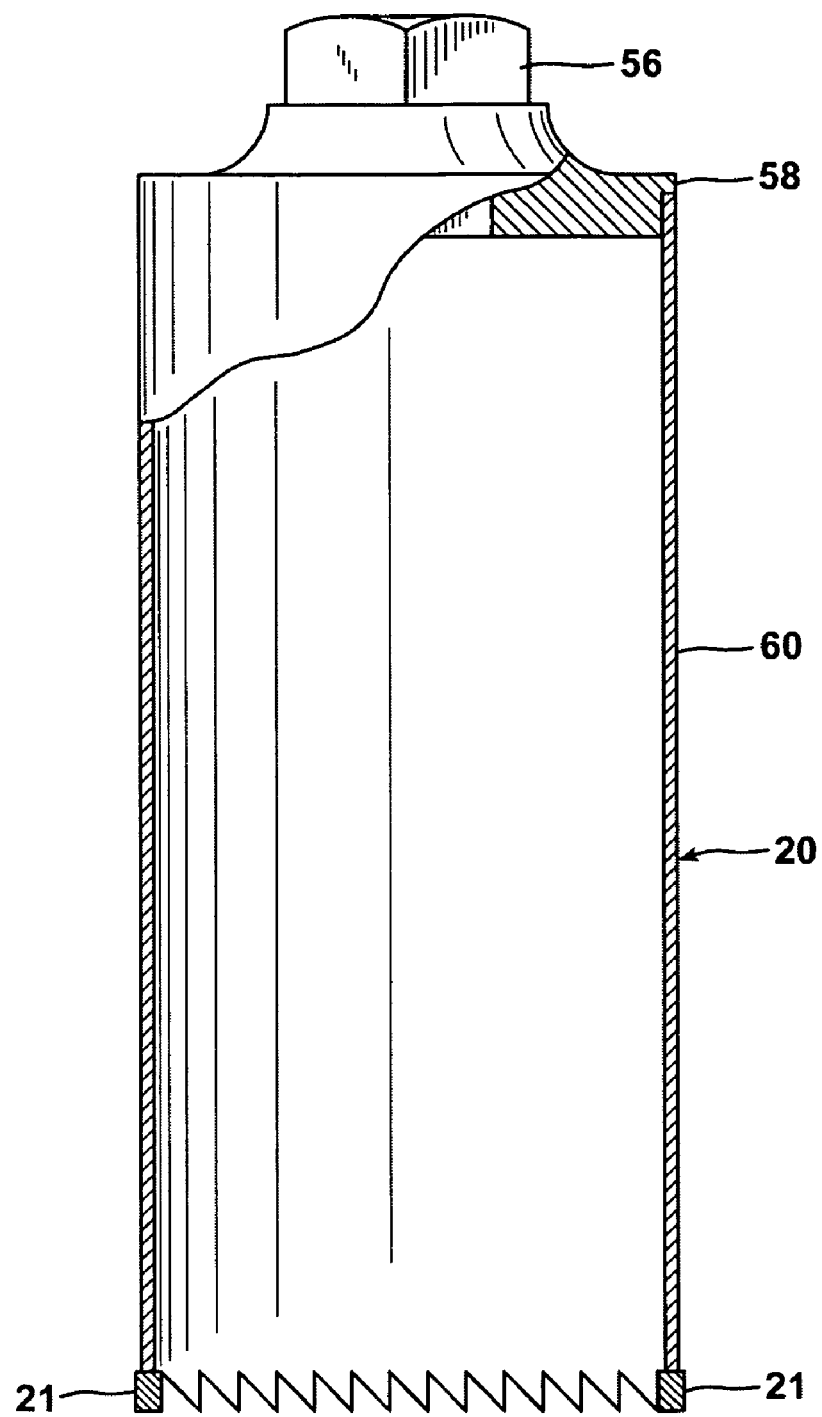
FIG. 8 is an elevational view, partially broken away in section, of the tubular core drill bit shown in isolation.

The collar 56 includes a radial, annular flange 58 that provides a seat for the upper edge of the relatively large diameter, cylindrical, annular portion 60 of the tubular core drill bit 20, as illustrated in FIG. 8. The core drill bit 20 has an opposite, annular lower edge 21 that is serrated and has a multiplicity of industrial diamond concrete cutting teeth thereon.

Figure 6:
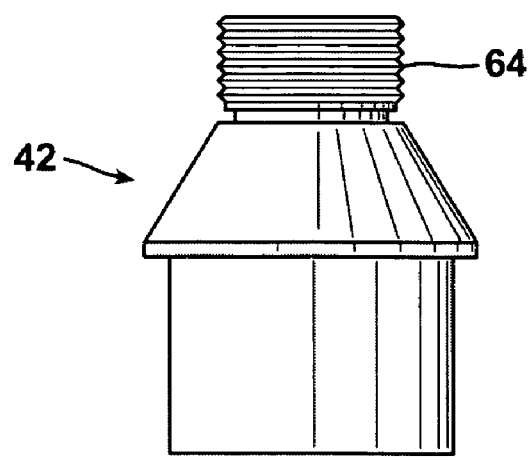
FIG. 6 is an elevational detail showing one embodiment of an upper coupling for the upper end of the drive shaft, shown in isolation.

At its upper end extremity the drive shaft assembly 18 is provided with an upper coupling member, which may be the drill bit coupling 42 illustrated in FIGS. 6 and 10. The coupling member 42 has a hollow, cylindrical duct 62 defined axially down its center, as shown in FIGS. 7 and 10. The duct 62 is provided to receive water from a conventional water feed drill motor equipped with its own cooling water supply (not shown). The upper, hollow extremity of the upper drill bit coupling 42 terminates in an externally threaded male tip 64 that is engaged in a female socket in the conventional waterfeed drill motor. The upper coupling 42 is rigidly attached to the upper extremity of the tubular drive shaft 38 by means of a pair of diametrically opposed shear pins 66 that have shanks that extend into radial bores defined in the wall structure of the upper coupling 42, as illustrated in FIGS. 7 and 10.

Once the mandrel 12 has been installed in the concrete 22 so that its upper extremity extends upwardly in the manner of an upright guidepost, as illustrated in FIG. 4, the male connector 64 of the upper coupling 42 is threaded into the internally threaded female socket in the water-cooled drill motor, while the nipple 43 at the lower coupling 40 is threaded into the collar 56 of the tubular core drill bit to which it is rigidly connected, as indicated in FIG. 9. The hole coring assembly 10 is then lowered down onto the mandrel 12, with the bearings 54 residing in contact with the outer surface 17 of the mandrel 12 to ensure precise, coaxial alignment of the drive shaft 38 of the drive shaft assembly 18 relative to the mandrel 12, as shown in FIG. 10.

Once the teeth at the lower edge 21 of the tubular core drill bit 20 reach the upper surface of the concrete slab 22, the drill motor is operated, thereby rotating the entire drive shaft assembly 18 in rotation about the stationary mandrel 12. The permanently lubricated bearing sleeves 54 allow high speed rotation-of the drive shaft assembly 18 relative to the mandrel 12. For example, where the outer diameter of the tubular core drill bit 20 is four inches, the drive shaft assembly 18 can be rotated at a speed of 6000 RPM. In contrast, the same drill bit of a conventional Core Drill Rig can only be rotated at a maximum speed of about 600 RPM. The ability to rotate the core drill bit 20 at high speed allows the operator to manage the same horsepower with less torque reaction. As a result the force applied to the cutting surfaces is lower and the cutting speed of the diamond teeth used is closer to optimum cutting speed. This allows the system to cut as fast as a drill rig of similar power.

Furthermore, in the hole coring system, the bearings 54 are located much closer to the upper surface concrete material 22 than the bearings of a conventional tubular core drill bit assembly. By stabilizing the drive shaft 38 closer to the surface of the concrete slab 22, greater stability and precise centering of the tubular core bit assembly 20 relative to the stationary mandrel 12 is achieved. The relatively long overall lengths of about three inches of the tandem mounted bearings 54 within the lower coupling 40 aid in stabilizing the drive shaft assembly 18, so that it remains perpendicular to the concrete slab 22.

The hole coring system 10 may be utilized to drill large holes such as holes having a diameter greater than three (3) inches. For drilling holes having a diameter of between three inches and eight inches, the anchor bore 26 preferably has a diameter of about one-half inch. For drilling holes having a diameter significantly greater than eight inches, the anchor bore 26 may preferably be replaced with a group of two or more anchors at a generally central area of the hole to be bored.

Once the drive shaft assembly 18 with the tubular core drill bit assembly 20 attached thereto has been lowered onto the mandrel 12 and centered relative thereto by the bearings 54, the cooling and flushing water is turned on, and the motor is actuated to turn the drive shaft assembly 18. Rotation of the core bit assembly 20 starts when the lower edge of the core drill bit 20 is just above the surface of the concrete 22 to be cut. The core drill bit 20 is then pushed gently downwardly with a force sufficient to overcome the water pressure of the cooling water that is entrapped between the mandrel 12 and the core drill bit 20.

The mandrel 12 is an accurately sized piece of high strength steel. The mandrel 12 forms a guide and axle about which the cylindrical, annular, saw blade 60 spins at high speed. The drive shaft assembly 18 serves the dual function of connecting the motor power for turning the core drill bit 20, and also guiding the core drill bit 20 by means of the internal bearing sleeves 54 that run on the mandrel 12. Depending upon the depth of the large diameter hole to be cut, it may be necessary to withdraw the core drill bit 20, break off the concrete core that has been cut, and then drill further using the hole that has been cut that far as a guide for further drilling.

During the drilling process, cooling and flushing water flows from the water supply within the drill motor down through the central duct 62, down through the hollow drive shaft 38, and into the annular space between the inner surface of the drive shaft 38 and the outer surface 17 of the mandrel 12. The cooling water flows through the neck at the upper end of the lower coupling 40 and past the bearings 54 which provide sufficient clearance for the passage of liquid. The cooling water flows downwardly into the cylindrical, annular cavity between the mandrel 12 and the inner wall surface of the core bit 20, and down into the cylindrical, annular groove or channel cut by the industrial diamond teeth at the lower edge 21 of the core bit assembly 20 into the concrete 22. Water is flushed downwardly below the lower cutting teeth of the core bit 20 and back upwardly alongside the outer surface of the core bit 20 to flush powdered concrete granular material radially outwardly away from the hole coring system 10 and across the flat upper surface of the concrete slab 22.

Figure 11:
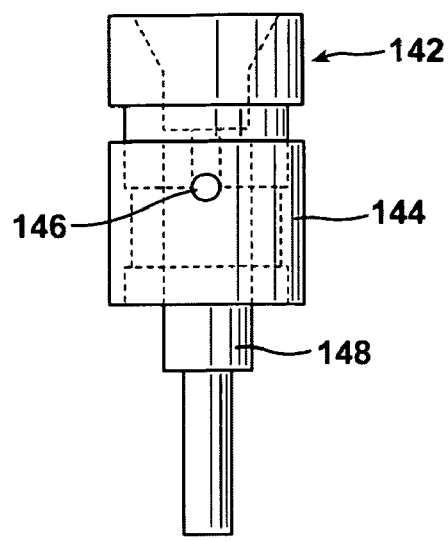
FIG. 11 is an elevational detail illustrating a different upper drive shaft end threaded connection employing a water swivel.

It is to be understood that numerous variations and modifications of the components of the hole coring system are possible. For example, the particular adapter or lower drill bit coupling 42 is designed for use with an electric drill motor having its own water supply. FIG. 11 illustrates an alternative embodiment in which the upper coupling 142 is an adapter for a drill chuck without a water supply. The coupling 142 is provided with a water swivel 144 having a radial port 146 through which water is directed radially inwardly and then down alongside the shank 148 of the adapter 142.

Figure 12:
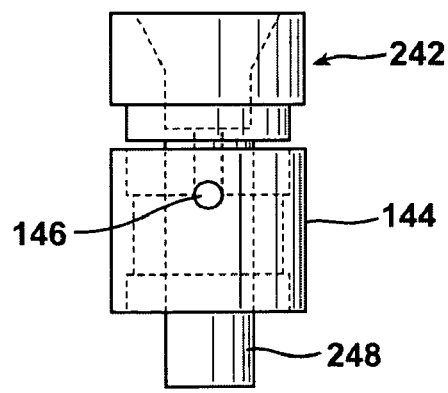
FIG. 12 is an alternative embodiment of the connection illustrated in FIG. 11.

FIG. 12 illustrates still another embodiment in which an electric grinder adapter 242 is also provided with a water swivel 144 having radial water input apertures 146. The adapter 242 differs from the adapter 142 in that the adapter 142 includes a stepped shank having an upper, larger diameter portion and also a narrower, lower small diameter portion. In the embodiment of FIG. 12 the shank 248 of the adapter 242 has a uniform diameter throughout.

Once the core has been cut, the mandrel 12 can be used as a handle to remove the concrete core from the concrete slab 22. The freshly cut concrete core can be dislodged from the mandrel 12 so that the mandrel can be reused.

Different mandrels are available and may be utilized. For example, a self-drilling mandrel may be utilized if the material to be drilled is plastic, rather than concrete. Also, mandrel anchors may be provided as either disposable items or reusable structures. Reusable anchors are preferably provided for the larger diameter anchor holes.

The drill motor that drives the drive shaft can be any one of a multitude of power drill motors that are available in the construction industry. Also, while water is preferably supplied in the drilling process as the preferred cutting fluid, other liquids such as oil or some other fluid may be utilized instead.

As previously explained, a very advantageous feature involves the releasable latching of the hollow drive shaft to the mandrel. FIGS. 13-16 and illustrate one such embodiment employing a hollow mandrel 120 which may be releasably engaged by the hollow drive shaft 180. The hollow mandrel 120 is illustrated in isolation in FIG. 13 and defines a mandrel cavity 122 of circular cross-section therewithin. The mandrel 120 has an upper engagement end 123 and a lower anchoring end 124 while an upper internal bearing ledge 127 (FIG. 16) is located a short distance below the upper engagement end 123. A lower internal bearing ledge 126 is located above the anchoring support end 124. The lower internal bearing ledge 126 serves as a delineation in the mandrel cavity 122 between an intermediate cylindrical cavity portion 128 and a lower cylindrical cavity portion 130. The upper bearing ledge 127 delineates the intermediate cylindrical cavity portion 128 from an upper cylindrical cavity portion 129. The intermediate cylindrical cavity portion 128 is greater in diameter than the lower cylindrical cavity portion 130, while the upper cylindrical cavity portion 131 is slightly greater in diameter than the intermediate cylindrical cavity portion 128.

A longitudinally extending, elongated slot 132 is defined diametrically through the mandrel 120 and extends radially between the smooth, cylindrical intermediate outer surface 17 thereof and the lower cylindrical cavity portion 130 therewithin. The elongated slot 132 is located beneath the bearing ledge 126.

Diametrically opposed, circular, radial latching lug openings 134 are defined a short distance beneath the upper engagement end 123 in the hollow mandrel 120. The latching lug openings 134 extend between the smooth, cylindrical, intermediate, outer surface 17 of the hollow mandrel 120 and the upper, cylindrical cavity portion 128 therewithin.

A piston 150 is provided which has a circular cross-section and a shoulder 152 which divides the piston 150 into a cylindrical, enlarged diameter upper portion 154 and a cylindrical, reduced diameter lower portion 156. The piston 150 is mounted for reciprocal movement within the mandrel cavity 122.

A transverse latch release lever 158 passes diametrically through the reduced diameter lower portion 156 of the piston 150 and through the slot 132 to project radially outwardly behind the cylindrical outer surface 17. The latch release lever 158 provides a means for manually moving the piston 150 in reciprocal nature within the cavity 122 in the hollow mandrel 120. The bearing ledge 126 limits the downward movement of the shoulder 152 of the piston 150 within the hollow mandrel 120, while the upward movement of the piston 150 is limited when the latch release lever 158 reaches the top of the elongated slot 132.

Figure 14:
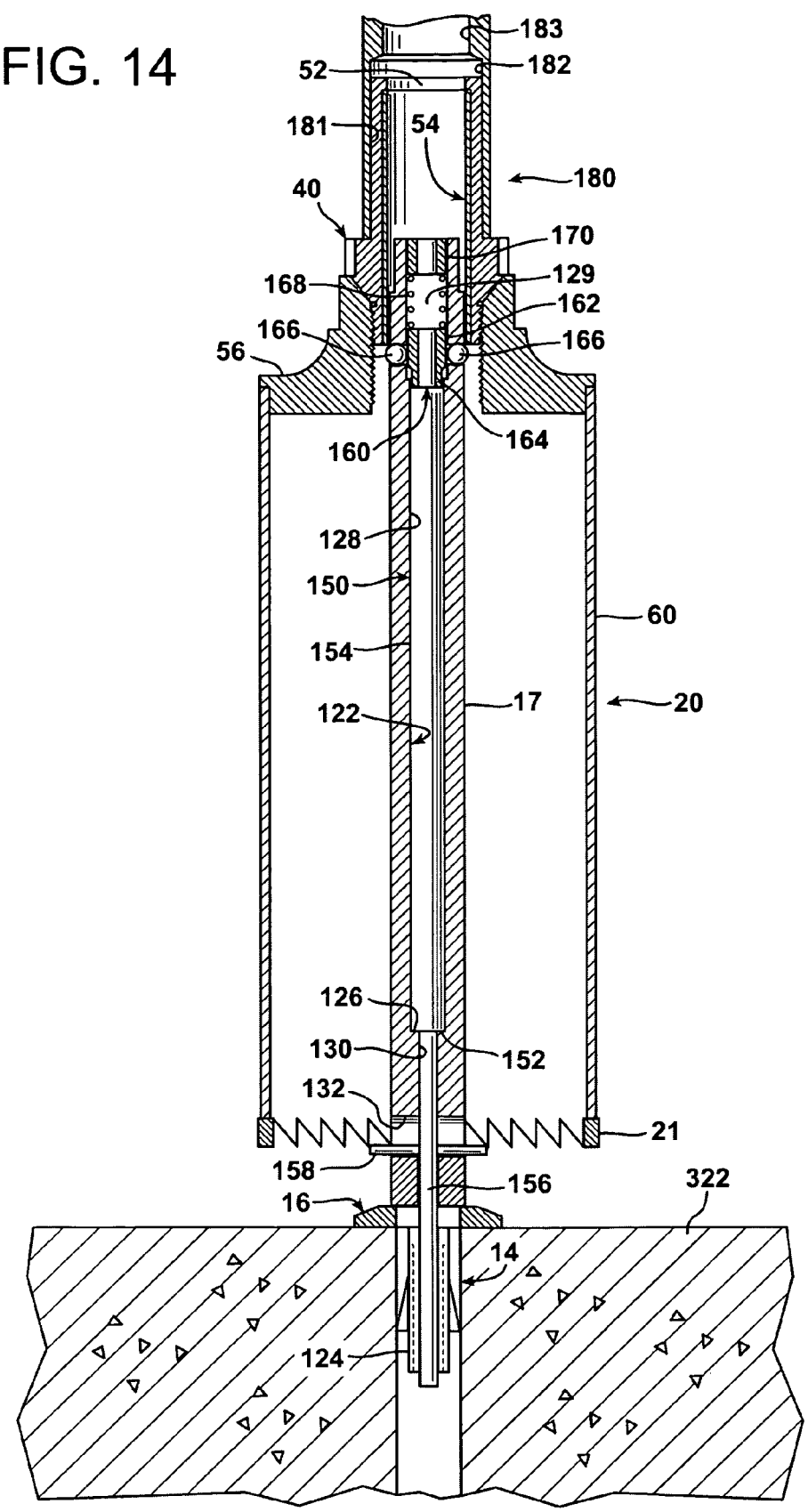
FIG. 14 is a sectional elevational view showing the hollow drive shaft assembly with a core drill bit engaged thereon being lowered onto the mandrel of FIG. 13.
Figure 15:
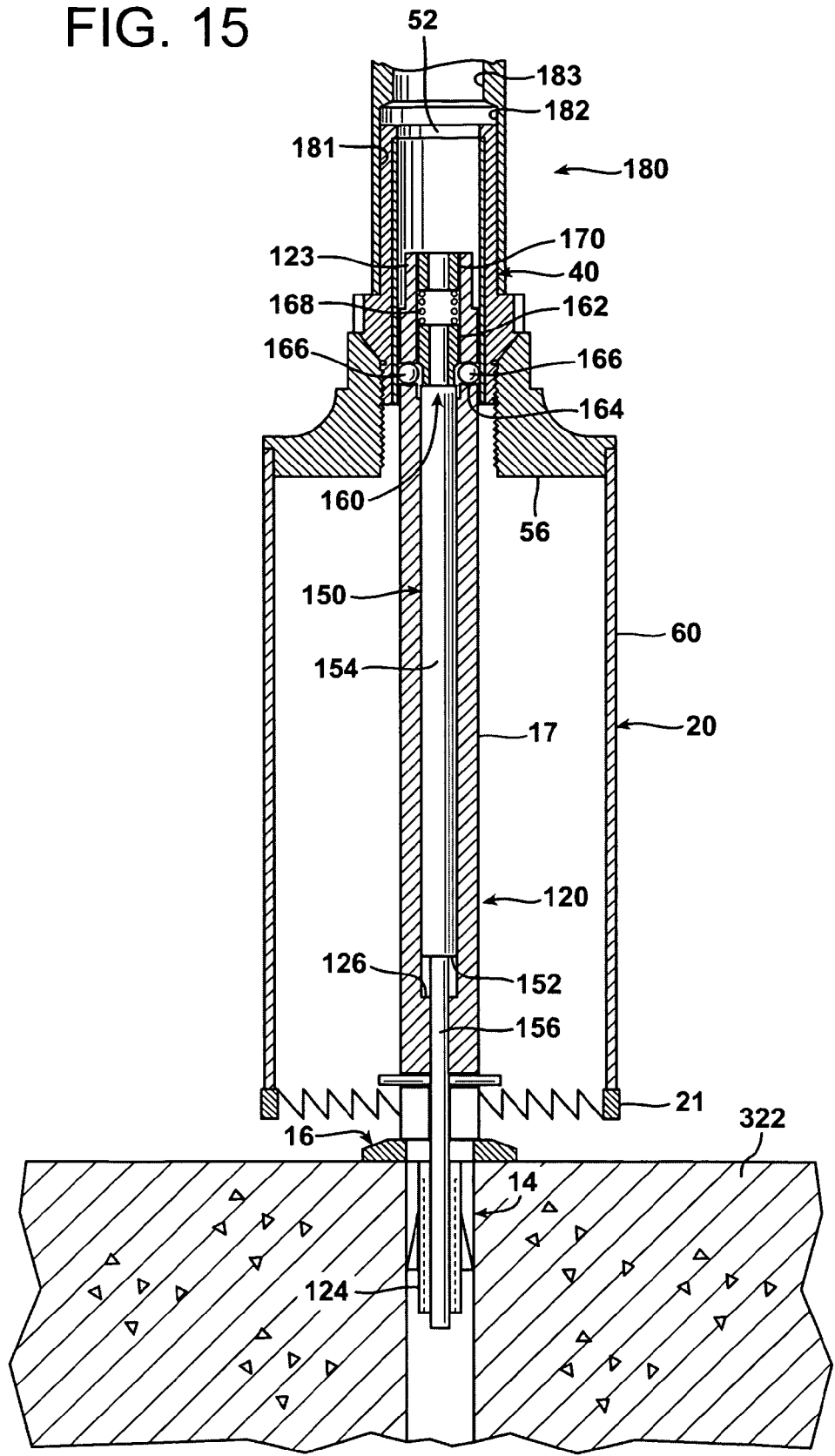
FIG. 15 illustrates retraction of the latching mechanism of the mandrel in the embodiment of FIG. 14.
Figure 16:
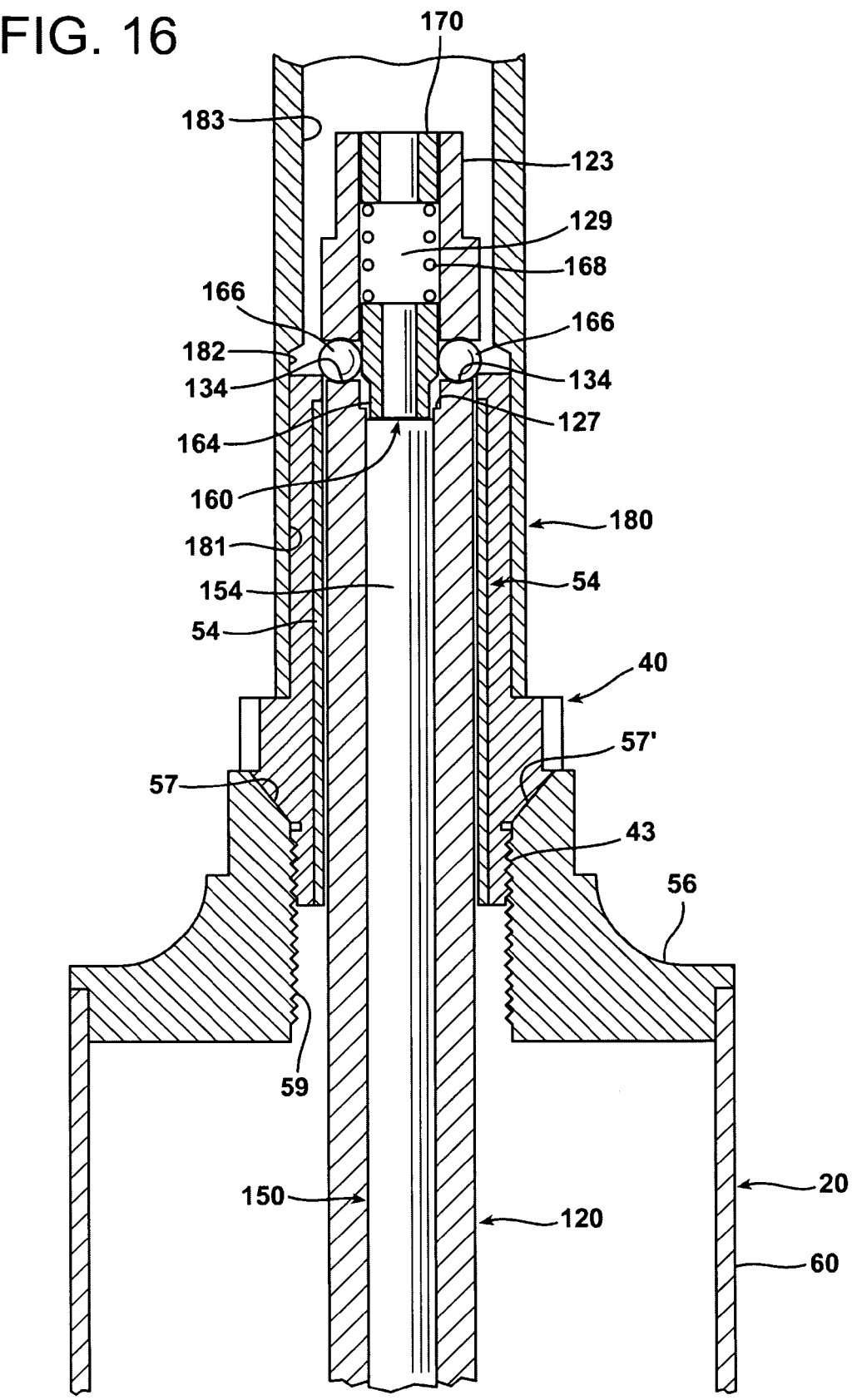
FIG. 16 illustrates engagement between the latching and catch mechanisms of the embodiment of FIG. 14.

A piston head 160 is located atop the piston 150 and is illustrated in greater detail in FIGS. 14-16. The piston head 160 has a cylindrical, annular upper portion 162 that slides smoothly within the smooth wall of the upper cylindrical cavity portion 129 of the mandrel cavity 122. At its lower extremity the piston head 160 is necked down to form as part of its structure a lower, reduced diameter latching lug receiving neck 164.

Figure 13:
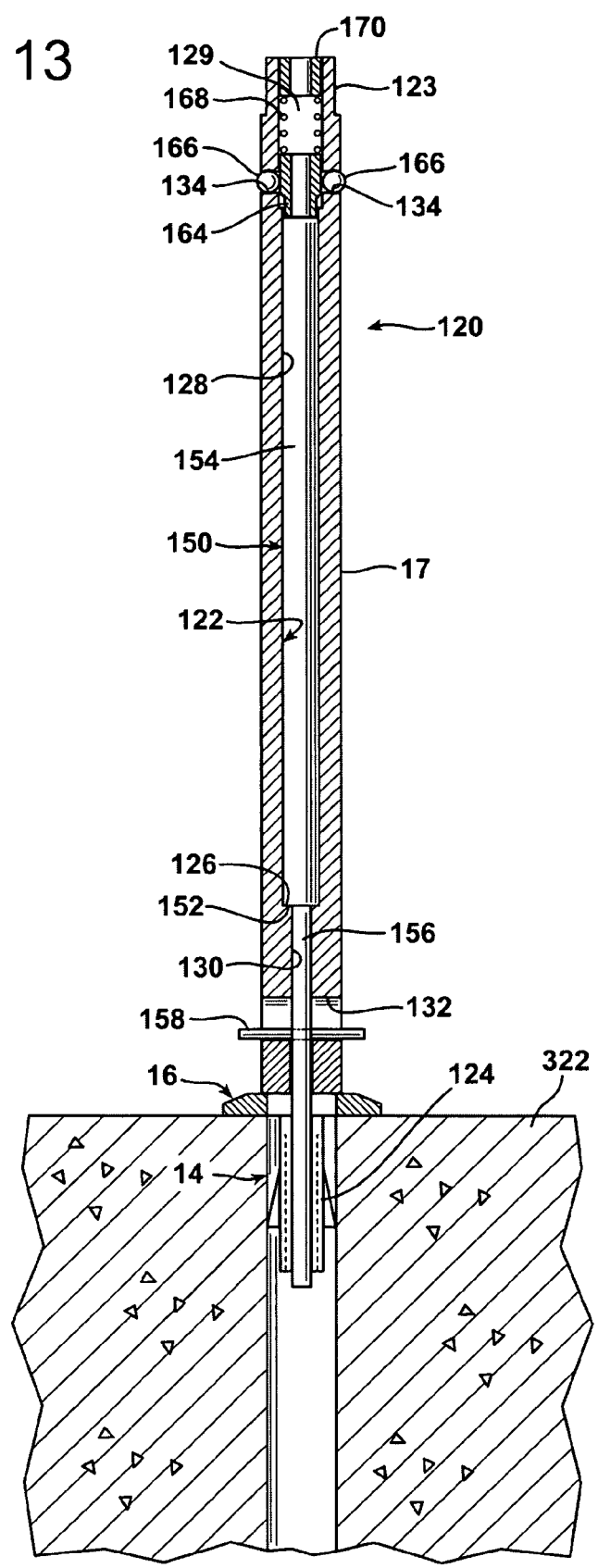
FIG. 13 illustrates another alternative embodiment of a mandrel employed according to the system.

A pair of diametrically opposed latching lugs in the form of a pair of small spheres 166 are located in the mandrel 120 within the diametrically opposed radial latching lug openings 134 therein. The mouth apertures of the transverse, radial latching lug receiving openings 134 at the outer surface 17 of the mandrel 120 are very slightly smaller in diameter than the transverse, radial openings 134 and the spherical lugs 166 therein. Consequently, while the radial outermost surfaces of the spherical latching lugs 166 can protrude radially outwardly behind the outer diameter of the smooth, cylindrical outer surface 17, as illustrated in FIG. 13, the spherical lugs 66 remain entrapped by the structure of the mandrel 120.

A coil spring 168 is located within the upper cavity portion 129 of the hollow, cylindrical cavity 122 within the mandrel 120 atop the piston head 160. The coil spring 168 is compressed against the top of the piston head 160 by an annular plug 170. The coil spring 168 thereby biases the piston head 160 and the piston 150 in a downward direction toward the anchoring support end 124 of the mandrel 120. This biasing action normally pushes the latching lug receiving neck 164 out of radial alignment with the spherical latching lugs 166. As a consequence, under the normal actions of the biasing spring 168, the upper portion 162 of the piston head 160 pushes the latching lugs 166 radially outwardly so that their outer surfaces protrude slightly radially beyond the outer surface 17 of the mandrel 120, as illustrated in FIG. 13.

The hollow, cylindrical annular drive shaft 180 differs in construction from the drive shaft 18. Specifically, the interior diameter of the interior wall surface 183 of the intermediate portion of the drive shaft 180 above the lower coupling 40 is smaller than the interior diameter of its lower end. The lower end of the drive shaft 180 thereby forms an internal socket 181 that receives the lower coupling 40 therewithin. However, the diameter of the interior wall surface 183 is slightly greater than the interior diameter of the bearing 54 so that it provides clearance for the outer surface of the spherical lugs 166, as illustrated in FIG. 16. Also, an internal, radial annular channel 182 of even greater diameter is defined just above the socket 181 that receives the lower coupling 40. The channel 182 is located within the drive shaft 180 and below the wall surface 183 of the interior intermediate portion of the drive shaft 180 between the driving end thereof (not visible) and the bearings 54.

In operation the drive shaft 180 is disposed coaxially about the mandrel 120 and lowered in coaxial alignment therewith, as illustrated in FIG. 14. However, due to the force of the biasing spring 168, the piston head 160 and the piston 150 are pushed downwardly so that the shoulder 152 of the piston 150 resides in abutment against the internal bearing ledge 126 within the mandrel 120. When the piston head 160 is forced downwardly in this manner, the latching lug receiving neck 164 is located within the mandrel 120 at a level lower than the latching lugs 166, so that downward movement of the hollow drive shaft 180 is limited by the interference between the lowermost cylindrical bearing 54 and the radially outwardly protruding portions of the latching lugs 166.

When the hollow drive shaft 180 is lowered to the position depicted in FIG. 14, the user lifts upwardly on the latch release lever 158, thereby overpowering the spring 168 and pushing the piston 150 upwardly within the mandrel cavity 122, as illustrated in FIG. 15. When the latch release lever 158 resides in abutment against the upper edge of the longitudinally elongated slot 132, the latching lug receiving neck 164 of the piston head 160 resides in longitudinal registration and in radial alignment with the spherical latching lugs 166. This allows the spherical latching lugs 166 to be pushed radially inwardly by the weight of the drive shaft 180 and the annular core drill bit 20, which can then be lowered downwardly toward the surface of the concrete 22, as indicated in FIG. 15.

The drill motor is then coupled to the upper end of the drive shaft 180 and operated, thereby driving the drive shaft 180 in rotation about the hollow mandrel 120. As the annular core drill bit 20 progresses downwardly the lower coupling 40 and the lower end of the drive shaft 180 also move downwardly, as illustrated in FIG. 15. Once the lower coupling 40 advances downwardly past radial alignment with the piston head 160, its upper edge clears the spherical latching lugs 166, as illustrated in FIG. 16. Without radial resistance against the spherical latching lugs 166 applied by the bearings 54 within the lower coupling 40, the force of the spring 168 is sufficient to push the piston head 160 and the piston 150 back downwardly thereby forcing the upper portion 162 of the piston head 160 into longitudinal registration with the spherical latching lugs 166. This movement forces the spherical latching lugs 166 radially outwardly and into the gap that exists at the radial, annular channel 182 defined near the lower end of the hollow, cylindrical annular drive shaft 180 just above the lower coupling 40.

Clearance also exists between the radially extended latching lugs 166 and the drive shaft interior wall surface 183 as the drill bit 20 descends further into the concrete slab 322. When this occurs the spherical latching lugs 166, which form the engageable part of the latch mechanism of this embodiment, have sufficient clearance with respect to the interior wall surface 183 to allow continued downward movement of the drive shaft 180 about the hollow mandrel 120. This downward movement continues until the annular drill bit 20 cuts completely through the slab of the concrete 322.

At this point the mandrel 120, together with the "doughnut" of concrete in which is embedded tend to drop downwardly relative to the drive shaft 180. However, once the mandrel 120 drops sufficiently so that the spherical latching lugs 166 meet the upper edge of the lower coupling 40, further downward movement is arrested. This is because the upper portion 162 of the piston head 160 has a large enough diameter so that the spherical latching lugs 166 cannot be pushed radially inwardly within the openings 134 a sufficient distance to clear the internal diameter of the upper end of the lower coupling 40. As a consequence, the spherical latching lugs 166 are lodged in the internal, radial, annular channel 182 in the hollow drive shaft 180, so that they releasably couple the mandrel 120 to the hollow drive shaft 180. The mandrel 120 remains engaged with the hollow drive shaft 180 until the latch release lever 158 is again purposely forced upwardly in the slot 132 to overcome the biasing spring 168 and bring the piston head neck 164 into longitudinal registration with the spherical latching lugs 166. This allows the mandrel 120 to be withdrawn from the drive shaft 180.

Figure 18:
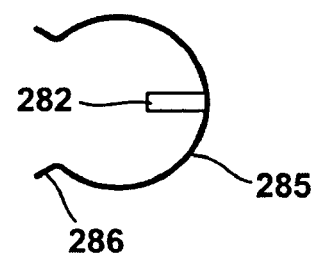
FIG. 18 is a top plan detail of the biasing spring and catch pin employed in the embodiment of FIG. 17, shown in isolation.
Figure 17:
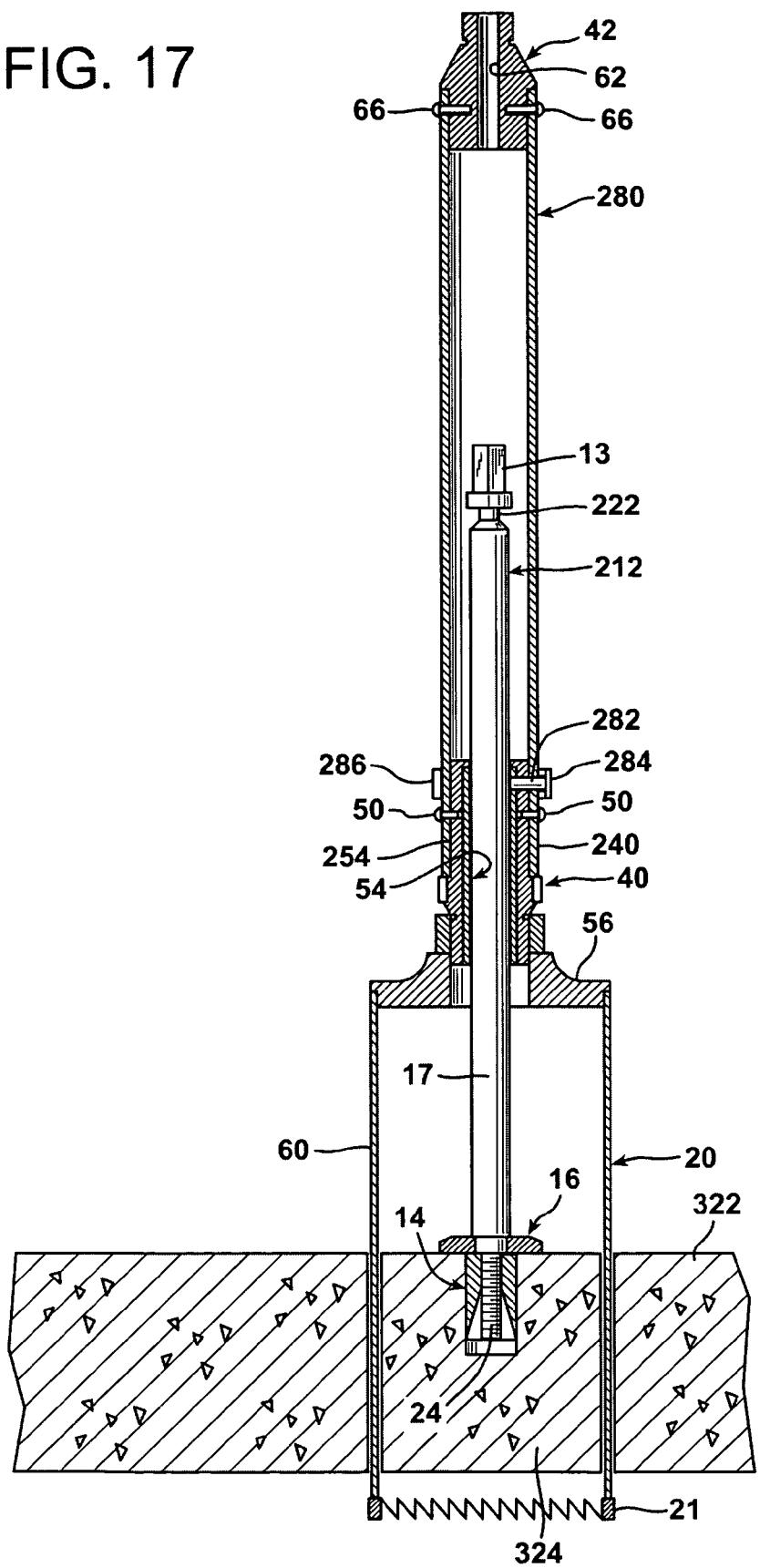
FIG. 17 is a sectional elevational view illustrating an alternative embodiment employing different types of catch and latching mechanisms.
Figure 19:
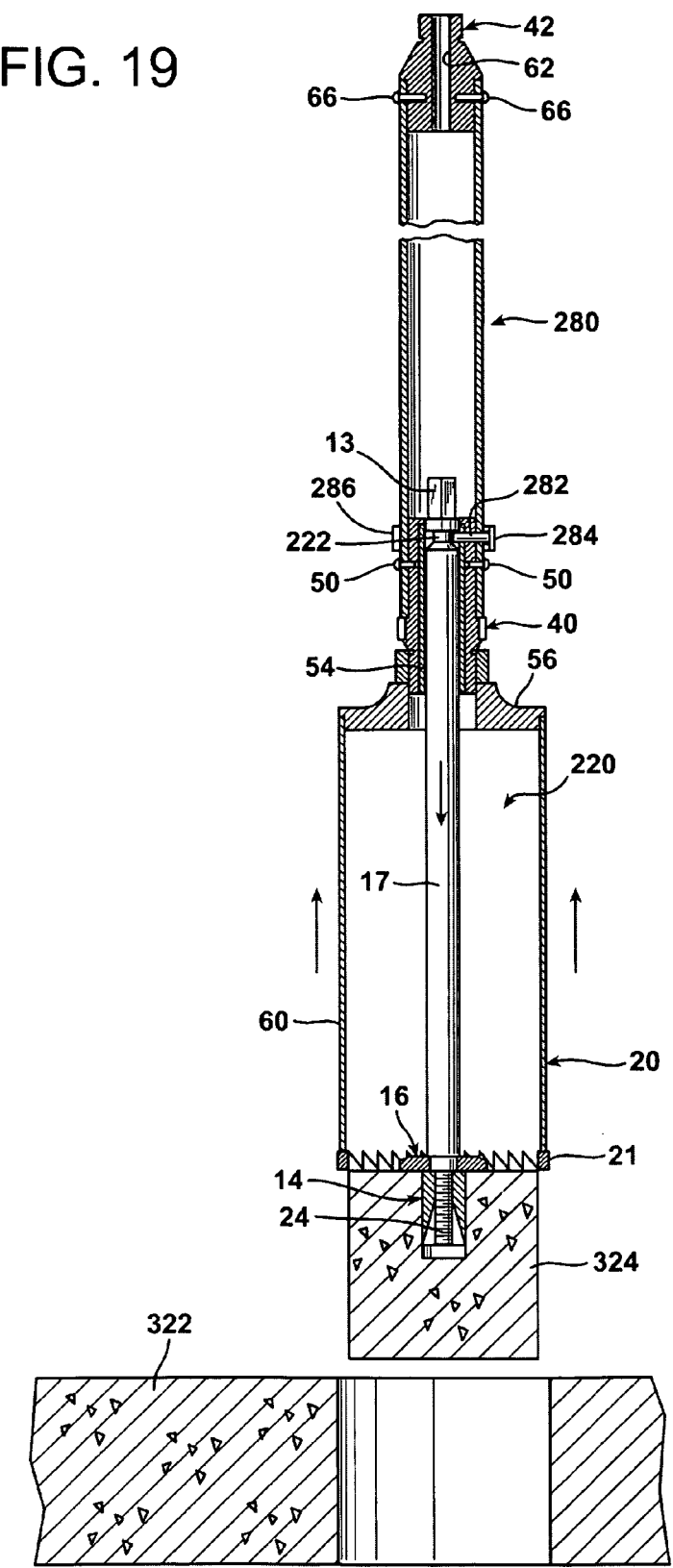
FIG. 19 is a sectional elevational view showing the catch and latching mechanisms of the embodiment of FIG. 17 engaged and illustrating removal of a concrete core from a concrete slab from which it has been extracted.

FIGS. 17, 18 and 19 illustrated a further, preferred embodiment in which the mandrel 212 is formed as a solid rod like the mandrel 12, but is provided with a releaseable latching mechanism in the form of a reduced diameter latching neck 222 located just below the hexagonal shaped upper mandrel end 13. The cylindrical, hollow annular drive shaft 280 is provided with a radially disposed catch pin 282. The drive shaft 280 has a radial catch pin receiving opening defined at its lower end through its cylindrical annular wall to receive the catch pin 282. Corresponding, aligned radial openings are also formed through the lower coupling 240 and the uppermost bearing 254 located radially within the confines of the lower coupling 240.

The catch pin 282 is secured to a generally horseshoe-shaped clip spring 284, illustrated in isolation in FIG. 18, and projects radially inwardly therefrom. The feet 286 of the spring clip 284 embrace the outer surface of the drive shaft 280 so that the arcuate portion 285 of the clip 284 is normally slightly elastically deformed when the inner tip of the catch pin 282 bears radially inwardly pressed into contact with the cylindrical outer surface 17 of the mandrel 212, as illustrated in FIG. 17. The spring clip 284 resiliently biases the catch pin 282 radially inwardly, urging it against the cylindrical outer surface 17 of the mandrel 212.

The catch pin 282 is radially movable within the catch receiving opening defined in the outer wall of the drive shaft 280 and the aligned apertures through the lower coupling 240 and the upper, cylindrical bearing 254. The hollow drive shaft 280 is normally longitudinally movable relative to the mandrel 212, as well as rotatable at high-speed rotation relative thereto. Therefore, as the large diameter core drill bit 20 drills an annular channel or groove into the concrete slab 322, the hollow drive shaft 280 moves longitudinally toward the lower, anchored end 24 of the mandrel 212.

Once the core drill bit 20 cuts completely through the thickness of the concrete slab 322 the mandrel 212 and the chunk of concrete 324 within the circumference of the core drill bit 20 will tend to drop vertically downwardly from the position show in FIG. 17, free from the concrete slab 322. However, the descent of the mandrel 212 and the "doughnut" 324 is halted when the latching neck 222 drops vertically to the level of the catch pin 282. This occurs when there is sufficient relative longitudinal movement between the hollow, cylindrical annular drive shaft 280 and the mandrel 212 to bring the catch pin 282 into longitudinal registration with the latching neck 222. That is, when the mandrel 212 drops downwardly far enough, the bias of the spring 284 pushes the catch pin 282 radially inwardly into engagement with the latching neck 222, thereby longitudinally immobilizing the mandrel 212 relative to the drive shaft 280.

The drive shaft 280 can then be lifted vertically, carrying the mandrel 212 and the concrete "doughnut" 324 with it, as illustrated in FIG. 19. By releasably coupling the mandrel 212 to the drive shaft 280, damage or injury in the area beneath the concrete slab 322 is avoided. Once the drive shaft 280 and the mandrel 212 have been raised upwardly, as illustrated in FIG. 19, the mandrel 212 can be released by pressing laterally inwardly against the sides of the spring clip 24 which bows the arcuate portion 285 of the spring clip 284 radially outwardly, away from the mandrel 212. This action pulls the catch pin 282 radially out from engagement with the latching neck 222.

Figure 20:
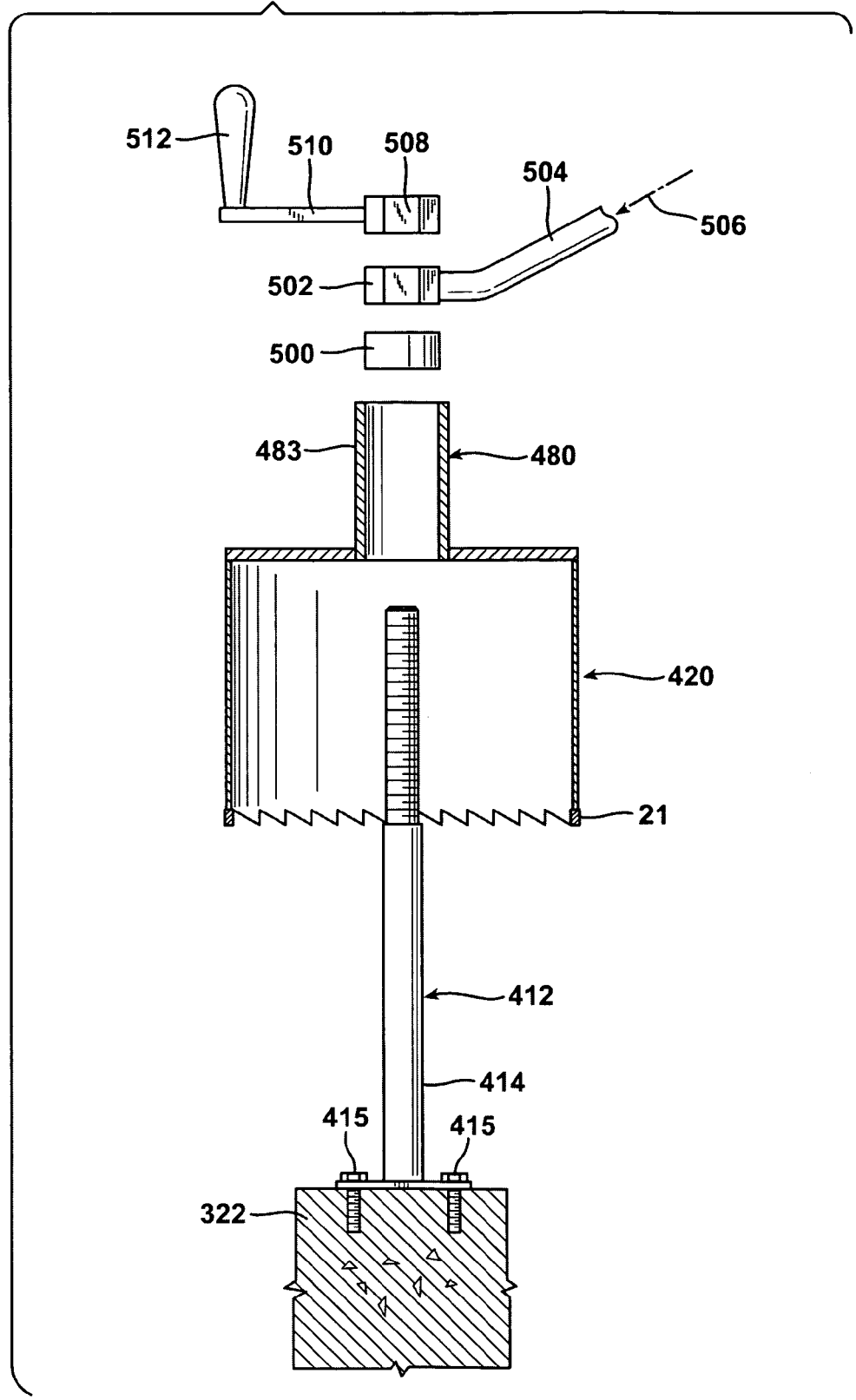
FIG. 20 is an exploded, sectional elevational view illustrating another alternative embodiment.

FIGS. 20-23 illustrate a further preferred embodiment especially suitable for use in drilling larger diameter bores. As shown in FIG. 20, the mandrel 412 may have an upwardly projecting engagement end 413 which may be externally threaded. In this embodiment, the anchoring end 414 of the mandrel 420 may be attached to plate or washer 416. The plate or washer 416 may be bolted to the concrete slab 322 by concrete bolts 415. The bolts 415 may be tightened until the plate or washer 416 is tightly pushed against the concrete slab 322. The angle of the mandrel 412 to the concrete slab 322 may determine the angle of the hole to be drilled.

The lower, coupling end 481 (see FIG. 21) of the hollow, tubular drive shaft 480 may be permanently and rigidly secured to the tubular, annular core drill bit 420. The upper driving end portion 483 (see FIG. 20) of the drive shaft 480 has a hexagonal, outer surface cross-sectional configuration. A cylindrical, annular Oil Lite sleeve bearing 54 (see FIG. 21) is force fitted into the lower end portion 481 of the hollow drive shaft 480. The sleeve bearing 54 assists in allowing the drive shaft 480 and drill bit 420 to remain centered on the mandrel 412 while rotating about the mandrel 412. The sleeve bearing 54 aids in maintaining the drive shaft 480 and core drill bit 420 in precise coaxial alignment relative to the mandrel 412 during the cutting operation.

Figure 21:
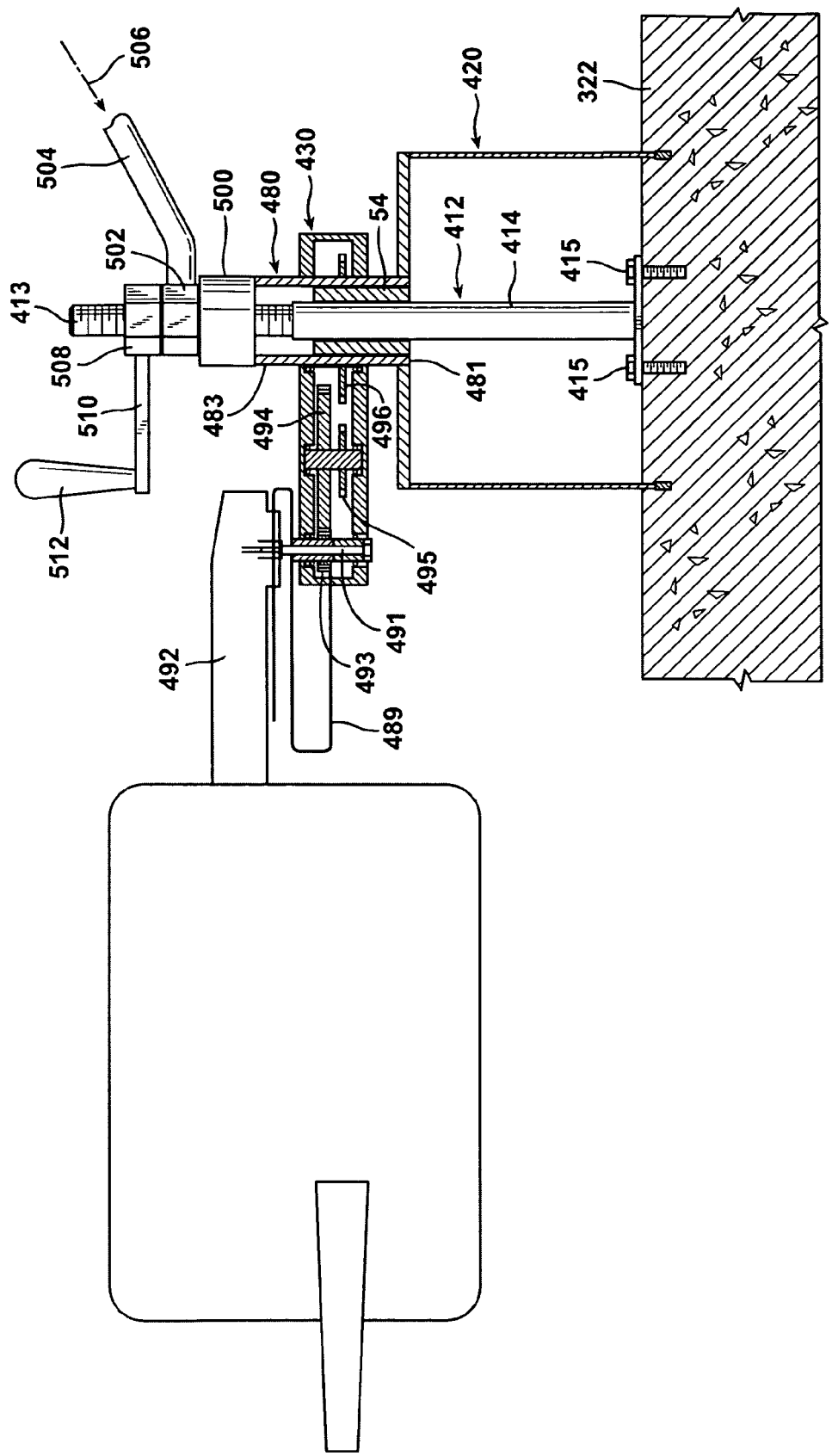
FIG. 21 is an elevational view, partially in section, showing the operation of the embodiment of FIG. 20.

A power transmission gearbox 430 is shown in FIG. 21 and transmits rotational energy from a motor 492 to the drive shaft 480. The gearbox 430 may be disposed about the upper driving end 483, of the hollow, annular drive shaft 480. The gearbox 430 contains a power input shaft 491 at its power input end which is journaled within the gearbox 430 for rotation of an output sleeve 497 (see FIG. 22) and driven by a high-speed motor 492. The motor 492 may be a conventional motor of the type utilized to rotate a saw blade for sawing concrete, electric saw, gas powered chop saw, etc. and may be provided with a saw blade guard 489. However, when utilized, the saw blade is optionally removed and instead the saw motor 492 receives the upwardly projecting end of the power input shaft 491 that protrudes from the top of the gearbox 430, as shown in FIG. 21. The motor 492 may also be fixedly attached to the gearbox 430 such that the motor 492 does not rotate relative to the gear box 430. By way of example and not limitation, the housing of the motor 492 may be bolted to the gear box 430.

Figures 22, 23:
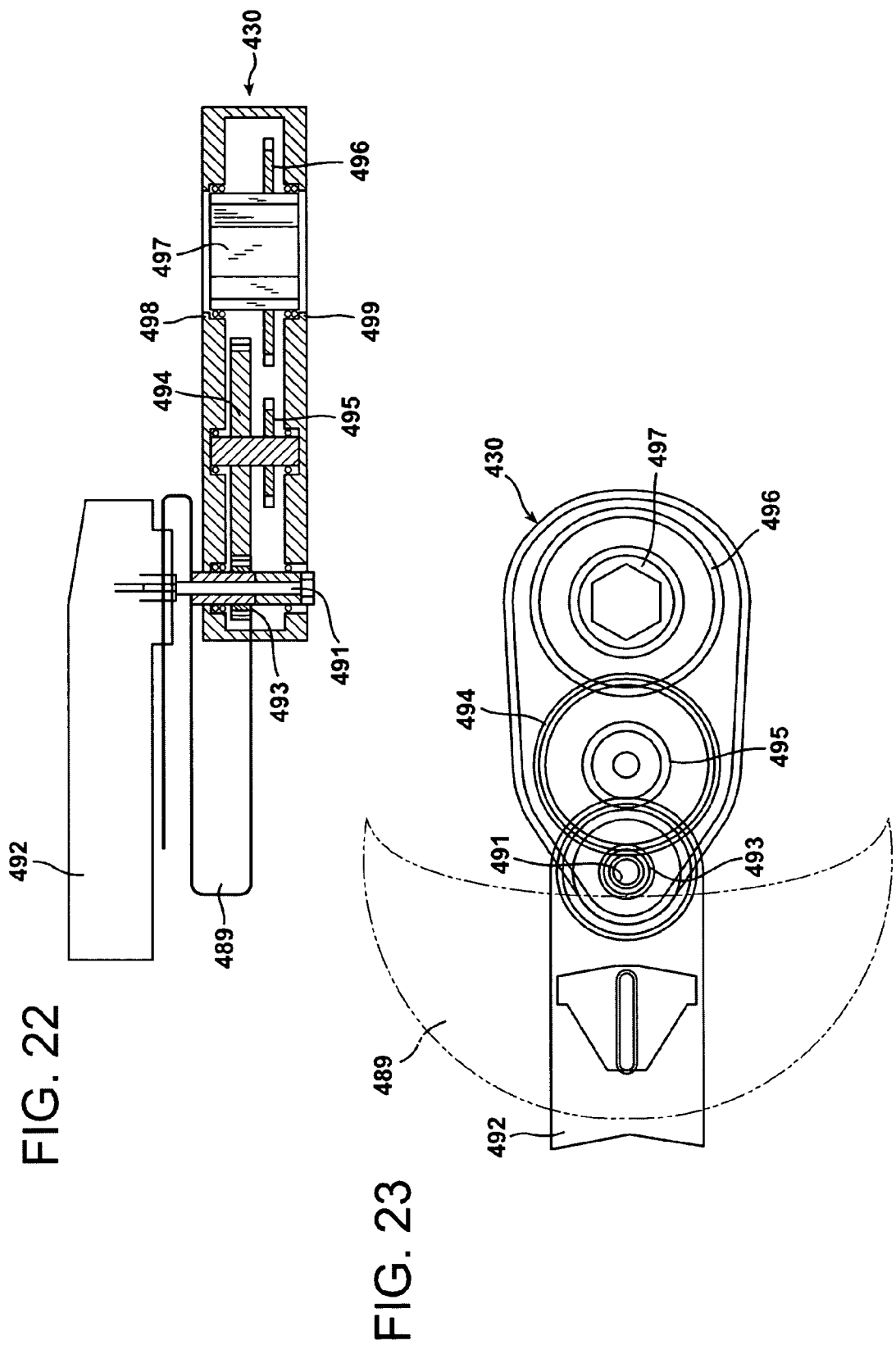
FIG. 22 is an enlarged elevational detail, partially in section, of a portion of the embodiment of FIG. 21.
FIG. 23 is a top plan diagrammatic view showing the operating components illustrated in FIG. 22.

The gearbox 430 contains gears 493 and 494 and a chain drive system 495, 496. These power transmission elements reduce the speed and increase the torque of power delivered from the motor 492. The chain drive system 495,496 rotates the power output sleeve 497 that has an internal axial opening of hexagonal cross-sectional configuration, as shown in FIG. 23. The sleeve 497 fits smoothly about the outer, hexagonal cross-sectional surface of the driving end 483 of the drive shaft 480 to drive it in rotation therewith.

The sleeve 497 rotates freely within bearings provided in the gearbox 430, but is entrapped by upper and lower retaining ledges 498 and 499 (see FIG. 22) so that it is retained and longitudinally confined within the gearbox 430. The drive shaft 480 and the power output sleeve 497 may interlock with each other such that rotation of the power output sleeve 497 operates to rotate the drive shaft 480. By way of example and not limitation, as discussed above, the outer surface cross sectional configuration of the drive shaft 480 may be hexagonal. Similarly, the inner surface cross sectional configuration of the power output sleeve 497 may have a corresponding hexagonal shape. They 480, 497 may have a uniform cross section throughout in an axial direction, so that free longitudinal movement of the sleeve 497 relative to the drive shaft 480 parallel to the axis of the mandrel 412 is possible. During operation, the power output sleeve 497 may be disposed about the drive shaft 480. The size of the inner surface cross sectional configuration of the power output sleeve 497 may be sized such that the power output sleeve 497 may slide onto the drive shaft 480 and yet rotate the drive shaft 480 upon rotation of the power output sleeve 497.

Atop the drive shaft 480 there is a hollow, annular thrust bearing 500 (see FIG. 21) at its upper extremity with an internal diameter slightly larger than the outer diameter of the threaded upper end 413 of the mandrel 412. A hollow, cooling water delivery collar 502 is located directly above the thrust bearing 500 and has a cooling water inlet line 504 connected thereto to receive cooling water as indicated by the directional arrow 506 (see FIG. 21). The collar 502 may be elongate to allow the advancement nut 508 to displace the drill bit 420 to a predetermined depth or until the drill bit 420 has penetrated the entire thickness of the substrate. The thrust bearing 500 permits relative rotation of the upper driving end 483 of the drive shaft 480 relative to the cooling water delivery collar 502. Immediately above the cooling water delivery collar 502 there is a drill bit advancement nut 508 that is threadably engaged with the threaded upper end 413 of the mandrel 412. A drill crank advancement arm 510 is secured by welding to the drill bit advancement nut 508 and projects radially therefrom. A vertically extending crank handle 512 projects perpendicularly upwardly from the radial outboard end of the crank arm 510. The operator may turn the drill bit advancement nut 508 to traverse the drill bit 420 into the concrete slab 322.

The power transmission gearbox 430 is disposed about the drive shaft 480 and is located longitudinally between the drill bit advancement nut 508 and the anchoring support end 414 of the mandrel. Prior to drilling, the plate or washer 416 is first secured to the upper surface of the concrete slab 322 by means of the concrete bolts 415 (see FIGS. 20-21). The upper driving end 483 of the drive shaft 480 is then inserted through the hexagonal opening in the power output sleeve 497 that is entrapped within the gearbox 430. The drive shaft 480, with the core drill bit 420 rigidly secured thereto, is then lowered onto the mandrel 412 with the hollow, tubular upper driving end 483 of the drive shaft 480 disposed coaxially about the mandrel 412 and in spaced separation therefrom. The threaded upper end 413 of the mandrel 412 thereby projects up through the gearbox 430 and the drive shaft 480 and through the hollow thrust bearing 500, as shown in FIG. 21.

The cooling water delivery collar 502 is then lowered onto the exposed tip of the upper end 413 of the mandrel 412 and the drill bit advancement nut 508 is then threaded onto the upper extremity of the upper end 413 of the mandrel 412 and advanced downwardly toward the mandrel base 414 until the teeth of the annular saw blade of the core drill bit 420 exert a light downward pressure against the upper, exposed surface of the concrete slab 322.

Prior to interlocking the power output sleeve 497 and the drive shaft 480, the power input shaft 491 of the gearbox 430 may be coupled to the motor 492. By way of example and not limitation, the spindle of the motor 492 may be coupled to the power input 491 Also, the motor 492 may be fixedly attached to the gear box 430. After all of the components are assembled, the motor 492 is then started, thereby causing the power input shaft 491 to rotate and to drive the sleeve 497 in rotation at reduced speed and increased torque. The motor 492 does not rotate with respect to the gear box 430 because the housing of the motor 492 may be fixedly attached to the gearbox. However, the gearbox 430 and the motor 492 may be urged in an opposite direction compared to the drill bit rotation due to the frictional forces caused by the drill bit 420 and the substrate. The operator may hold the gear box 430 and the motor 492 in place.

At the same time, cooling water is fed into the cooling water delivery collar 502 and flows down through the hollow drive shaft 480 alongside the mandrel 412. The flow of cooling water is forced downwardly due to the fluid pathway formed in the cooling water delivery collar 502. From there the water flows laterally upon the surface of the concrete slab 322, and down into the annular groove being drilled by the annular core drill bit 420. The cooling water flows through the annular channel formed by the cutting teeth of the core drill bit 420 and flushes the particulate concrete grit created outwardly across the upper surface of the concrete slab 322 and outward away from the drill bit 420.

As drilling progresses the operator rotates the crank handle 512 in an orbital path about the upright mandrel 412 to advance the drill advancement nut 508 slowly toward the base 414 of the mandrel 412. This creates a downward force against the annular thrust bearing 500 at the top of the drive shaft 480 and presses the cutting edge of the annular core drill bit 420 into the concrete slab 322. The advancement nut 508 may be advanced downward. Also, coaxial alignment of the drive shaft 480 and the core drill bit 420 relative to the mandrel 412 is maintained.

As the drilling proceeds, the operator slowly advances the handle 512 in rotation about the mandrel 412 to continually press the cutting edge of the core drill bit 420 downwardly into the annular channel created as the drill bit teeth (i.e., cutting edge) bite into the concrete slab 322. As the drive shaft 480 is forced downwardly, the motor 492 and the gearbox 430 are also moved down with the drive shaft 480.

Rotation of the drive shaft 480 by the power input from the motor 422 continues in this fashion while maintaining continuous downward pressure upon the teeth of the drill bit 420 by continuous advancement of the core drill bit advancement nut 508. Drilling continues until the annular channel created by the rotating teeth of the drill bit 420 cuts the concrete slab 322 to a predetermined depth or completely through to the far side of the slab 322.

Figure 24:
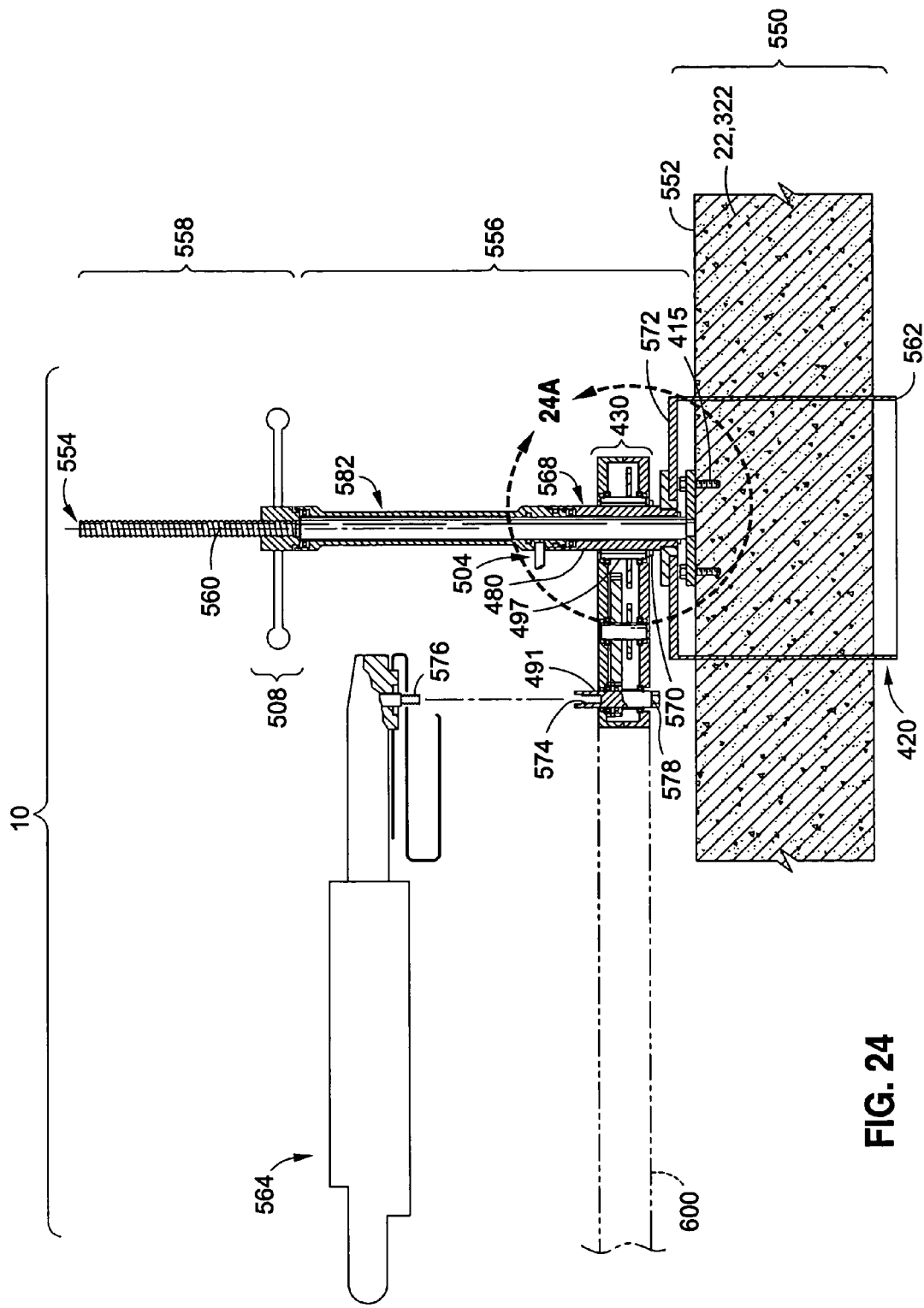
FIG. 24 is a cross sectional view of an alternative embodiment.
Figure 24A:
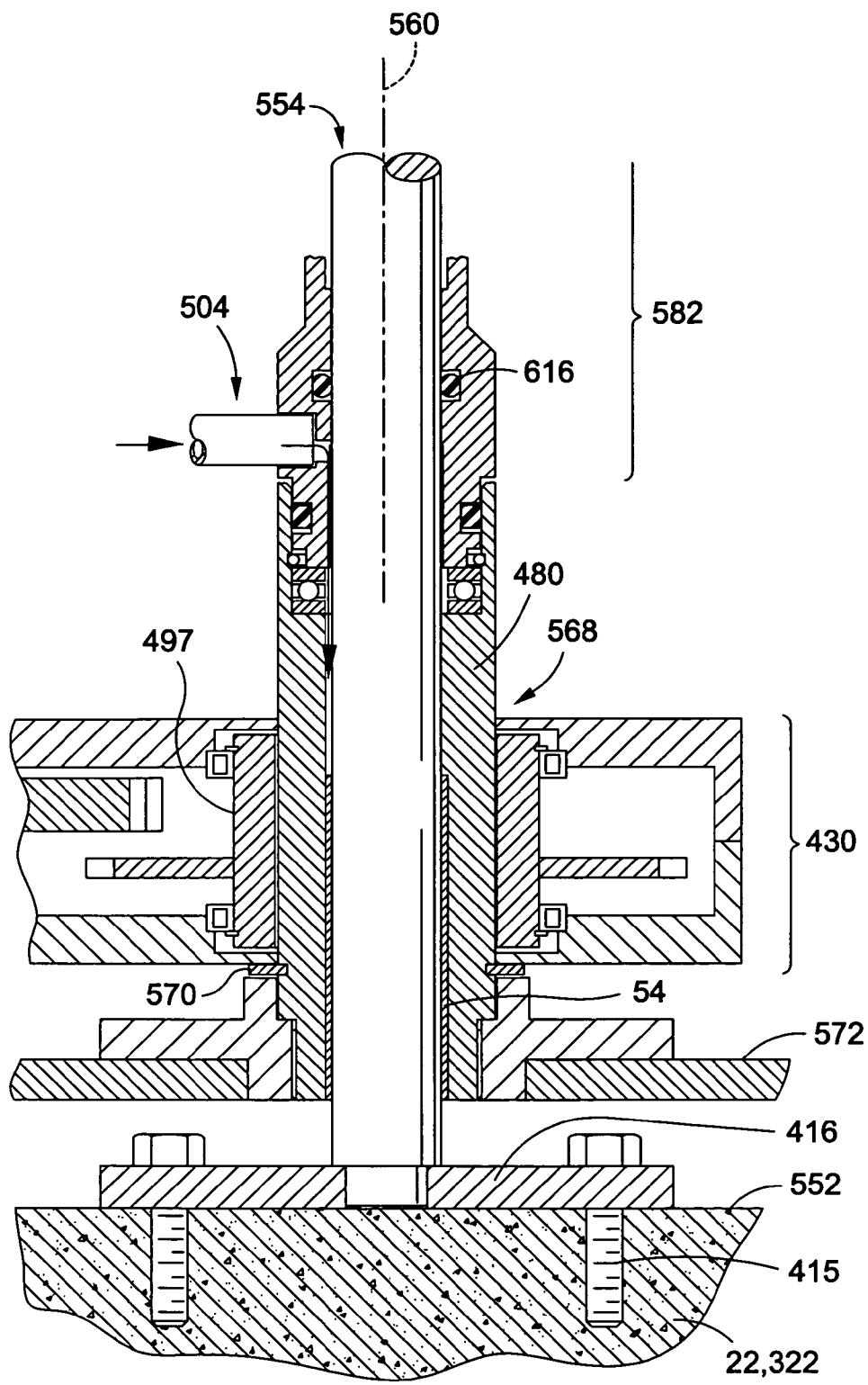
FIG. 24A is an enlarged cross section of the embodiment shown in FIG. 24.
Figure 25:
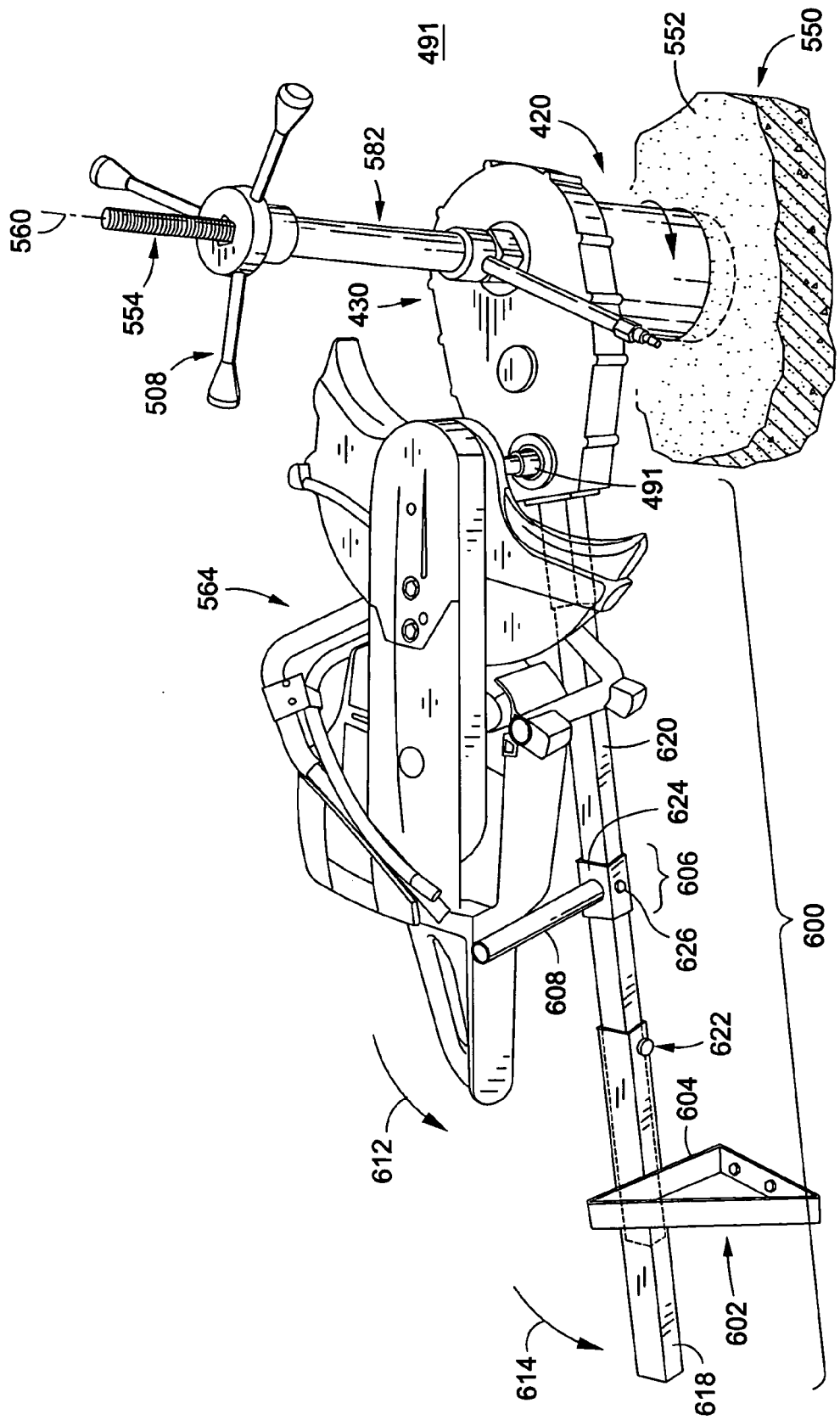
FIG. 25 is a perspective view of the embodiment shown in FIGS. 24 and 24A during use.

Referring now to FIGS. 24-25, a hole coring system 10 for producing a large diameter hole in a substrate 550 is shown. The substrate 550 may be a concrete slab 22, 322 or some other material such as plastic, wood, etc. In FIG. 24, the substrate 550 may define a generally horizontal ground surface 552. It is contemplated that the hole coring system 10 may be utilized to drill holes in a vertical surface, angled surface or a ceiling. To begin preparation for drilling a large hole in the substrate 550, a mandrel 554 may be secured to the surface 552 of the substrate 550. As discussed previously, the mandrel 554 may be secured to the substrate 550 with a concrete anchor or other attachment mechanism. By way of example and not limitation, the mandrel 554, and more particularly, the plate or washer 416 may be attached to the surface 552 with concrete bolts 415, as shown in FIG. 24A.

With the mandrel 554 attached to the surface 552, the drill bit 420 and the attached drive shaft 480 may be disposed about the mandrel 554. More particularly, the mandrel 554 may comprise a distal end portion 556 (i.e., guide post) having a smooth cylindrical configuration and a proximal end portion 558 having threads. The proximal and distal end portions 558, 556 may be coaxially aligned to each other. The drive shaft 480 may have a sleeve bearing 54 (see FIG. 24A) attached within the drive shaft 480. The sleeve bearing 54 coaxially aligns the drive shaft 480 and the drill bit 420 to the longitudinal axis 560 of the mandrel 554. Additionally, the sleeve bearing 54 permits the drive shaft 480 and the drill bit 420 to rotate about the longitudinal axis 560 of the mandrel 554 while maintaining coaxial alignment between the mandrel 554 and the drill bit 420. Additionally, the sleeve bearing 54 may be independently slid longitudinally along the distal end portion 556 of the mandrel 554 to guide the drill bit 420 into the substrate. The drill bit 420 is operative to form a hole in the substrate 550 via (1) rotation of the drill bit 420 about the longitudinal axis 560 of the mandrel 554 and (2) pressure applied to the surface 552 of the substrate 550 by a cutting edge 562 of the drill bit 420. With the application of pressure and rotation of the drill bit 420, the drill bit 420 produces an annular groove in the substrate 550. The drill bit 420 is rotated and pressure applied to the substrate 550 until the drill bit 420 has penetrated the substrate 550 to a predetermined depth or until the drill bit 420 has formed a hole through the substrate 550 (see FIG. 24).

The drill bit 420 may be rotated under a power of a motor 564. The motor 564 may be an electric drill, hand held radial saw, gas powered chop saw (see FIG. 25) or other device for producing a rotating shaft. The motor 564 may be coupled to the drive shaft 480 via a gearbox 430. More particularly, the drive shaft 480 may have a proximal end portion 568. The proximal end portion 568 of the drive shaft 480 may have a polygonal outer surface configuration (e.g., hexagonal). The gearbox 430 may have a power output sleeve 497 defining an inner surface. The cross sectional configuration of the inner surface of the power output sleeve 497 may have a corresponding configuration to the outer surface cross sectional configuration of the proximal end portion 568 of the drive shaft 480. The proximal end portion 568 of the drive shaft 480 may be inserted into the power output sleeve 497 to interlock the power output sleeve 497 and the drive shaft 480. Upon rotation of the power output sleeve 497, the drive shaft 480 and the drill bit 420 may also be rotated.

Below a distal end portion of the drive shaft 480, a shoulder 570 (see FIG. 24A) may be formed. The shoulder 570 may be a snap ring fitted within a groove of the drive shaft 480 and attached to the drive shaft 480. The shoulder 570 may be gapped or spaced apart from the proximal surface 572 of the drill bit 420. The drive shaft 480 is inserted into the power output sleeve 497 until the power output sleeve 497 contacts the shoulder 570. Accordingly, the gearbox 430 is gapped above the drill bit 420.

Prior to interlocking the power output sleeve 497 and the drive shaft 480, the motor 564 may be attached to a power input shaft 491 of the gearbox 430. The power input shaft 491 may protrude from the gearbox 430 away from the substrate 550, as shown in FIG. 24. Moreover, the power input shaft 491 may have a threaded hole 574. Typically, the motor 564 will have a rotating threaded stud 576. The threaded stud 576 may be threaded into the threaded hole 574. To assist in the engagement of the threaded hole 574 of the power input shaft 491 to the threaded stud 576 of the motor 564, the gearbox 430 may additionally have a rotatable shaft 578 (see FIG. 24). The rotatable shaft 578 may have a wrenching surface that permits an operator to turn the shaft 578 in the clockwise or counter-clockwise direction with a wrench. Upon rotation of the shaft 578, the power inputs shaft 491 also rotates. To thread the threaded stud 576 of the motor 564 into the threaded hole 574 of the power input shaft 491 of the gearbox 430, the distal end of the threaded stud 576 may be aligned against the threaded hole 574. The user may rotate the rotatable shaft 578 in the appropriate direction via a wrench in order to threadingly engage the threaded stud 576 into the threaded hole. The user continues to rotate the shaft 578 until the threaded stud 576 is secured to the threaded hole 574. The housing of the motor 564 may be unsecured to the gear box 430. Alternatively, it is contemplated that housing of the gearbox may be secured to the gearbox 430, as previously described. With the motor 564 attached to the gearbox 430, the power output sleeve 497 may be disposed around the proximal end portion 568 of the drive shaft 480. The gearbox 430 is stopped by the shoulder 570 such that the distal end 580 of the rotatable shaft 578 does not interfere with the drill bit 420. This may be particularly problematic when the radius of the drill bit 420 is equal to or greater than the distance between the power output sleeve 497 and the rotatable shaft 578. The shoulder 570 helps to lift or gap the gearbox 430 away from the drill bit 420 such that the rotatable shaft 578 does not contact or interfere with the drill bit 420.

After the gearbox 430 is mounted to the drive shaft 480, a collar 582 may be disposed about the mandrel 554, and more particularly, a proximal end portion 558 of the mandrel 554. The distal end of the collar 582 may have a thrust bearing that interfaces with the proximal portion of the drive shaft 480. The thrust bearing located at the distal end portion of the collar 582 permits rotation of the drive shaft while the collar 582 does not rotate and generally remains stationary. The proximal end portion of the collar 582 may also have a thrust bearing. On top of the collar 582, an advancement nut 508 may be threaded onto the threaded proximal end portion 558 of the mandrel 554. The advancement nut 508 engages the thrust bearing at the proximal end portion of the collar 582. As the advancement nut 508 is advanced along the proximal end portion 558 of the mandrel 554, a force is transferred through the collar 582, drive shaft 580 and the drill bit 420 such that the cutting edge 562 of the drill bit 420 applies pressure onto the surface 552.

In summary, the motor 564 rotates the drill bit 420 via the gearbox 430. The advancement nut 508 transmits a downward cutting force to the drill bit and into the substrate 550.

The collar 582 may be fitted with a liquid inlet line 504, as shown in FIG. 24A. The inlet line 504 may be tapped into the distal end portion of the collar 582. An upper seal 616 disposed above the inlet line 504 may form a water seal between the mandrel 554 and the collar 582. As fluid is injected into the inlet line 504, the fluid enters the collar 582 and flowed downward between the drive shaft 480 and mandrel 554 then into the interior of the drill bit 420. The fluid also enters the annular groove or channel created by the drill bit in the substrate 550 and exits outside of the drill bit 420. The fluid may serve two purposes, namely, a lubricating function and a cooling function. The fluid may lubricate and cool the sleeve bearing 54 on the distal end portion 556 of the mandrel 554. Moreover, the fluid may remove frictionally generated heat between the cutting edge 562 and the wall of the drill bit 420 with the substrate 550.

Referring now to FIG. 25, the gearbox 430 may have a lever arm 600. The lever arm 600 may be bolted to and extend away from the gearbox 430. Preferably, the lever arm 600 is telescoping such that the operator may adjust the length of the lever arm to resist any torsional rectional forces caused by the rotation of the drill bit 420 into the substrate 550. Instead of holding the lever arm 600 manually with a hand, a brace 602 may be attached to an adjacent structure or the surface 552 (see FIG. 25). The brace 602 may be sufficiently tall such that the lever arm 600 will contact the brace 602 at the start of the cutting operation. The brace 602 may additionally have a front surface 604 which may be generally parallel to the longitudinal axis 560 of the mandrel 554. In this manner, as the drill bit 420 penetrates the substrate 550, the gearbox 430 as well as the lever arm 600 will approach the surface 552. The lever arm 600 may slide against the front surface 604 as the drill bit 420 penetrates the substrate 550.

Additionally, a second brace 606 may be slideably attached to the lever arm 600. The second brace 606 prevents rotation of the handle of the motor 564. Since the input shaft 491 may be attached to various types of motors having handles of various lengths, the second brace 606 may be adjustably positioned on the lever arm 600. In use, the motor 564 is attached to the gearbox 430. The housing of the motor 564 may still rotate with respect to the gearbox 430. The second brace 606 is positioned on the lever arm 600 such that the handle of the motor 564 will contact the second brace 606 during operation.

Preferably, the lever arm 600 is a plurality of successively smaller square tubes 618, 620. Each of these smaller tubes is slideably disposed within the subsequent larger tube. The tubes may be fixed to each other by a locking thumb screw 622 threaded into the larger tube 618 and wedgeable against the inner smaller tube 620. Similarly, the second brace 606 may have an extension 608 and a square tube 624 that may be disposed about the tubes 618, 620 of the lever arm 600. A thumb screw 626 may be threaded into the tube 210 and pressed against the lever arm 600 to fix the position of the second brace 606 on the lever arm 600.

To set up the hole coring system 10, the drill bit 420, gearbox 430, collar 582 and the advancement nut 508 may be mounted to the substrate 550 as discussed above. Moreover, the gearbox 430 may have a lever arm 600 attached thereto. The brace 602 may also be positioned adjacent the lever arm 600 to prevent rotation of the lever arm 600 during the cutting operation. It is also contemplated that the substrate or a nearby fixture may be used to stop the lever arm. Hence, in certain situations, the brace 602 is unnecessary. Moreover, the second brace 606 may be positioned on the lever arm 600 to prevent rotation of the motor during the cutting operation. It is also contemplated that the motor's housing may be fixed to the gearbox 430. Hence, in this situation, the brace 606 would not be necessary.

More particularly, as the drill bit 420 rotates, the drill bit 420 and the substrate 550 produce an opposite torquing force through the drive shaft 480 and gearbox 430. The opposing torquing force kicks the handle of the motor towards the second brace 606 in direction of arrow 612. Fortunately, the second brace 606 stops any further rotation of the motor's handle. Moreover, the frictional forces between the drill bit 420 and the substrate 550 causes the gearbox 430 as well as the lever arm 600 to rotate in a direction of arrow 614. Fortunately, the brace 602 blocks any further rotation of the gearbox 430 and the lever arm 600 such that all rotational forces may be applied to the substrate 550. As the drill bit 420 penetrates the substrate 550, the lever arm slides down the front surface 604 of the brace 602.

In an aspect of the system, the rotatable shaft 578 may also be used to manually rotate the drill bit 420 during the drilling process. For example, during the drilling process, the drill bit 420 may become locked into the substrate 550. In this situation, the user or operator may shut off the motor 462 and manually turn the drill bit 420 via the rotatable shaft 578 in reverse direction to loosen the drill bit 420 from the substrate 550.

In an aspect of the system, it is also contemplated that the proximal end portion of the mandrel may be internally threaded instead of externally threaded as shown in FIGS. 20-24. Moreover, the advancement nut may be replaced with an advancement bolt. The flange of the bolt head may be operative to push the drive shaft toward the substrate through the use of a collar or spacer.

The above description is given by way of example, and not limitation. Given the above disclosure, one skilled in the art could devise variations that are within the scope and spirit of the invention disclosed herein, including various ways of attaching the mandrel to the substrate (i.e., concrete). Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An apparatus for drilling holes in a substrate, the apparatus comprising:
 a mandrel having a distal end portion and a proximal end portion coaxially aligned to the distal end portion, the distal end portion being smooth and cylindrical, the distal end being attachable to the substrate, the proximal end portion being threaded;
 a hollow tubular drill bit disposed about the distal end portion of the mandrel;
 a drive shaft fixedly attached to the drill bit and disposed about the mandrel;
 a bearing mounted within the drive shaft and seated on the distal end portion of the mandrel;
 an advancement portion which threadably engages the threaded proximal end portion of the mandrel and pushes the drive shaft toward the substrate;
 a power transmission box having an output sleeve disposable about the drive shaft and an input shaft wherein rotation of the input shaft is operative to rotate the output sleeve;
 a motor coupleable to the input shaft of the power transmission box and operative to rotate the input shaft; and
 a lever arm attached to the power transmission box for resisting a reverse torque created by rotation of the drill bit in the substrate.

2. The apparatus of claim 1 wherein a housing of the motor is rotatable with respect to the power transmission box, and the apparatus further comprises a motor brace attachable to the lever arm to restrain rotation of the motor's housing due to the reverse torque created by rotation of the drill bit in the substrate.

3. The apparatus of claim 2 wherein the motor brace is selectively positionable along a longitudinal length of the lever arm to allow for various sized motors.

4. The apparatus of claim 1 wherein the lever arm is an elongate rigid bar.

5. The apparatus of claim 1 further comprising a lever arm brace attachable to the substrate in proximity of the torque arm to restrain rotation of the lever arm due to the reverse torque created by rotation of the drill bit in the substrate.

6. The apparatus of claim 5 wherein a front surface of the lever arm brace is generally linear and generally parallel to a longitudinal axis of the mandrel to permit the torque arm to slide down the front surface as the drill bit penetrates the substrate.

7. The apparatus of claim 1 further comprising a rotatable shaft attached to the power transmission box for manually rotating input shaft to assist in coupling the input shaft to a spindle of the motor or for manually rotating the output sleeve to assist in rotating the drill bit in reverse to loosen the drill bit from the substrate when locked together.

8. The apparatus of claim 1 wherein the motor is a gas powered chop saw or a rotary saw.

9. The apparatus of claim 1 wherein the advancement portion is a nut.

10. The apparatus of claim 1 further comprising an elongate collar between the advancement portion and the drive shaft.

11. The apparatus of claim 10 wherein the elongate collar and the advancement portion are fabricated from a unitary material.

12. The apparatus of claim 10 wherein the elongate collar and the drive shaft are fabricated from a unitary material.

13. A method of drilling holes in a substrate, the method comprising the steps of:
 attaching a mandrel to the substrate;
 attaching a drive shaft to a hollow drill bit;
 disposing the drive shaft and the drill bit about the mandrel;
 disposing an output sleeve of a power transmission box about the drive shaft such that rotation of the output sleeve rotates the drive shaft and the drill bit;

attaching a motor to an input shaft of the power transmission box for rotating the output sleeve;

adjusting a lever arm attached to the power transmission box such that the torque arm will contact a lever arm brace, substrate or proximate stationary object for resisting a reverse torque created by rotation of the drill bit in the substrate when the motor is turned on;

turning on the motor thereby rotating the input shaft, output power sleeve, drive shaft and the drill bit wherein the drill bit penetrates the substrate;

allowing the lever arm to come into contact with the lever arm brace, substrate or proximate stationary object to stop rotation of the lever arm due to the reverse torque created by rotation of the drill bit in the substrate.

14. The method of claim 13 further comprising the step of attaching the lever arm brace proximate to the lever arm.

15. The method of claim 14 further comprising the step of attaching a motor brace to the lever arm proximate to a housing of the motor to restrain rotation of the motor's housing due to the reverse torque created by rotation of the drill bit in the substrate.

16. The method of claim 13 further comprising the step of manually rotating a rotatable shaft operative to rotate the input shaft to assist in coupling a spindle of the motor to the input shaft.

17. The method of claim 13 further comprising the step of manually rotating a rotatable shaft operative to rotate the output sleeve to assist in reversing rotation of the drill bit to loosen the drill bit from the substrate when locked together.

18. An apparatus for drilling holes in a substrate, the apparatus comprising:

a mandrel having a distal end portion and a proximal end portion coaxially aligned to the distal end portion, the distal end portion being smooth and cylindrical, the distal end being attachable to the substrate, the proximal end portion being threaded;

a hollow tubular drill bit disposed about the distal end portion of the mandrel;

a drive shaft fixedly attached to the drill bit and disposed about the mandrel;

a bearing mounted within the drive shaft and seated on the distal end portion of the mandrel such that the drive shaft and drill bit may rotate about the distal end portion of the mandrel independent from longitudinal traversal of the drill bit and drive shaft along the distal end portion of the mandrel;

an advancement portion which threadably engages the threaded proximal end portion of the mandrel and pushes the drive shaft toward the substrate;

a power transmission box having an output sleeve disposable about the drive shaft and an input shaft wherein rotation of the input shaft is operative to rotate the output sleeve;

a motor having a housing and an output shaft, the motor housing fixedly attached to the power transmission box, the motor shaft coupled to the input shah of the power transmission box and operative to rotate the input shaft.

\* \* \* \* \*